(12) United States Patent
Aritake et al.

(10) Patent No.: US 8,393,795 B2
(45) Date of Patent: Mar. 12, 2013

(54) WHEEL BEARING APPARATUS INCORPORATED WITH A ROTATIONAL SPEED DETECTING APPARATUS

(75) Inventors: Yasuhiro Aritake, Iwata (JP); Kazuo Komori, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/421,936

(22) Filed: Mar. 16, 2012

(65) Prior Publication Data
US 2012/0177312 A1 Jul. 12, 2012

Related U.S. Application Data

(63) Continuation of application No. PCT/JP2010/066049, filed on Sep. 16, 2010.

(30) Foreign Application Priority Data

| Sep. 17, 2009 | (JP) | 2009-215253 |
| Dec. 4, 2009 | (JP) | 2009-276276 |
| Dec. 7, 2009 | (JP) | 2009-277963 |
| Sep. 13, 2010 | (JP) | 2010-203958 |

(51) Int. Cl.
*F16C 19/52* (2006.01)
*F16C 33/72* (2006.01)
(52) U.S. Cl. ........................ 384/489; 384/448; 384/544
(58) Field of Classification Search .................. 384/489, 384/544, 448
See application file for complete search history.

(56) References Cited

U.S. PATENT DOCUMENTS

| 6,997,615 | B2* | 2/2006 | Takada ........................... 384/448 |
| 7,758,248 | B2* | 7/2010 | Aida et al. ..................... 384/477 |
| 7,980,766 | B2* | 7/2011 | Tsuzaki ......................... 384/544 |
| 2004/0258337 | A1* | 12/2004 | Norimatsu et al. ........... 384/448 |
| 2007/0268013 | A1* | 11/2007 | Yamamoto et al. ........... 324/174 |
| 2007/0286541 | A1* | 12/2007 | Matsui et al. ................. 384/448 |

FOREIGN PATENT DOCUMENTS

| JP | 62-108002 | 5/1987 |
| JP | 2000-249138 | 9/2000 |
| JP | 2004-084798 | 3/2004 |
| JP | 2004-354299 | 12/2004 |
| JP | 2009-150437 | 7/2009 |
| JP | 2010-190421 | 9/2010 |
| WO | WO2009/078174 | 6/2009 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus incorporating a rotational speed detecting apparatus has a protecting cover. A cylindrical fitting portion of the cover is press-fit into the end inner circumference of the outer member. A donut-shaped shielding portion extends radially inward from the fitting portion, via a radially reducing portion. A bottom portion is continuous with the shielding portion, via a stepped portion, to close the inner-side end of the inner member. A sealing member is integrally adhered to the outer circumference of the radially reducing portion. The sealing member and annular portion has a diameter slightly smaller than the outer diameter of the fitting portion of the protecting cover. The sealing member projected portion has a diameter slightly larger than the outer diameter of the fitting portion of the protecting cover. The projected portion is press-fit into the end inner circumference of the outer member via a predetermined interference.

25 Claims, 21 Drawing Sheets

(a)

(b)

H2<H1

WHEEL BEARING APPARATUS INCORPORATED WITH A ROTATIONAL SPEED DETECTING APPARATUS

CROSS-REFERENCE TO RELATED APPLICATIONS

This application is a continuation of International Application No. PCT/JP2010/066049, filed Sep. 16, 2010, which claims priority to Japanese Application Nos. 2009-215253, filed Sep. 17, 2009; 2009-276276, filed Dec. 4, 2009; 2009-277963, filed Dec. 7, 2009; and 2010-203958, filed Sep. 13, 2010. The disclosures of the above applications are incorporating herein by reference.

FIELD

The present disclosure generally relates to a wheel bearing apparatus that rotatably supports a wheel of a vehicle, such as an automobile, with respect to a suspension apparatus. More particularly, it relates to a wheel bearing apparatus incorporating a rotational speed detecting apparatus to detect wheel speed of a vehicle. It is intended to improve the sealability of the wheel bearing.

BACKGROUND

Wheel bearing apparatus is generally known that can support a wheel of vehicle with respect to a suspension apparatus. The wheel bearing apparatus also incorporates a rotational speed detecting apparatus to detect a rotation speed of a wheel of vehicle to control the anti-lock braking system (ABS). Such a bearing apparatus generally includes a sealing apparatus arranged between the inner and outer members, rotating relative to each other, via sandwiched rolling elements. The sealing apparatus is integrally formed with a magnetic encoder with magnetic poles alternately arranged along its circumference. A rotational speed sensor to detect change of magnetic poles of the magnetic encoder caused by the rotation of a wheel is adapted to be mounted on a knuckle. Thus, forming part of a suspension apparatus after the wheel bearing apparatus has been mounted on the knuckle.

A structure shown in FIG. 24 is known as one example of a wheel bearing apparatus. This wheel bearing apparatus includes an outer member 100, an inner member 101, and a plurality of balls 102 contained between the outer member 100 and the inner member 101. The inner member 101 has a wheel hub 103 and an inner ring 104 fit onto the wheel hub 103.

The outer member 100 has on its outer circumference an integrally formed body mounting flange 100b. The outer member inner circumference includes double row outer raceway surfaces 100a, 100a. A sensor 113 is secured on the knuckle 115 via a bolt 116.

The wheel hub 103 is integrally formed with a wheel mounting flange 105 for mounting a wheel (not shown) on one end. The wheel hub also includes an inner raceway surface 103a. A cylindrical portion 103b axially extends from the inner raceway surface 103a. The inner ring 104, formed with an inner raceway surface 104a on its outer circumference is axially immovably secured to the cylindrical portion 103b by a caulked portion 103c formed by plastically deforming the end of the cylindrical portion 103b.

A sealing ring 106 is fit into the outer end of the outer member 100. A lip of the sealing ring 106 slidably contacts with a base portion 105a of the wheel mounting flange 105. On the other hand, an encoder 107 is mounted on the inner end outer circumference of the inner ring 104. The encoder 107 has an annular supporting member 108 with an L-shaped cross-section. A ring-shaped encoder body 109 is adhered to the side of the annular supporting member 108 along its whole or entire periphery. The encoder body 109 has N and S poles alternately arranged along its circumference.

The inner end opening of the outer member 100 is closed by a cover 110. The cover 110 is formed of non-magnetic sheet material such as non-magnetic stainless steel sheet, aluminum alloy sheet or high functional polymer etc. The cover 110 has a dish-shaped configuration and includes a disc-shaped closing plate portion 111 and a cylindrical fitting portion 112 formed around a periphery of the closing plate portion 111.

The side face of the encoder body 109, forming the encoder 107, is arranged opposite to and close to the cover 110. The detecting portion 114 of the sensor 113 is arranged close to or abuts against the side of the cover 110. Thus, the detecting portion 114 is arranged opposite to and close to the encoder body 109 via the cover 110. Accordingly, the presence of the cover 110 prevents the entry of water, iron powder or magnetized debris etc. into the space between the sensor 113 and the encoder 107. Thus, this prevents damage to the sensor 113 and the encoder 107 as well as cyclic interfere or deterioration of the magnetic properties of the encoder body 109 (see e.g. Patent Document 1 mentioned below).

However, the prior art wheel bearing apparatus has several problems which are described below. First, since the cover 110 is secured to the outer member 100 simply by a metal-to-metal contact, it is impossible to have sufficient sealability in the fit portion without improving the surface accuracy and roughness of the fitting surfaces.

In addition, since the cover 110 is formed simply as an angular "C"-shaped cross-section, its rigidity is not sufficient. Thus, there is a risk that the cover would contact the encoder body 109 due to deformation of the cover 110 caused by impingement of pebbles, etc. Furthermore, since the detecting portion 114 of the sensor 113 opposes the encoder 107 via the cover 110, the detecting accuracy would deteriorate due to an increase of the air gap.

To solve these problems, a wheel bearing apparatus incorporating a rotational speed detecting apparatus with a structure shown in FIG. 25 has been proposed. This bearing apparatus is adapted to be secured on a knuckle (not shown). The bearing apparatus has an outer member 121, forming a stator member, an inner member 122, and double row balls 123, 123 contained between the outer and inner members 121, 122. The inner member 122 includes a wheel hub 125 and an inner ring 126 fit onto the wheel hub 125.

The outer member 121 has an integrally formed body mounting flange 121b on its outer circumference. The outer member inner circumference includes double row outer raceway surfaces 121a, 121a. The inner member 122 is formed with double row inner raceway surfaces 125a, 126a that oppose the outer raceway surfaces 121a, 121a of the outer member 121. One of the inner raceway surfaces 125a, 126a is formed on the outer circumference of the wheel hub 125. The other inner raceway surface 126a is formed on the outer circumference of the inner ring 126. The inner ring 126 is press-fit onto a cylindrical portion 125b, axially extending from the inner raceway surface 125a, of the wheel hub 125. Double row balls 123, 123 are contained between the outer and inner raceway surfaces. The balls 123, 123 are rollably held by cages 127, 127.

The wheel hub 125 is integrally formed with a wheel mounting flange 124 to mount a wheel (not shown). The inner ring 126 is axially immovably secured onto the wheel hub 125 by a caulked portion 128. The caulked portion 128 is formed by plastically deforming the end of the cylindrical portion 125b radially outward. A seal 129 and a cover (sensor cap) 133 are mounted on opposite ends of the outer member 121. The seals 129 and cover 133 prevent leakage of lubricating grease sealed within the bearing and the entry of rain water or dust from the outside into the bearing.

A magnetic encoder 130 is press-fit onto the outer circumference of the inner ring 126. The magnetic encoder 130 includes an annular supporting member 131 formed by a magnetic metal sheet. The sheet has a substantially L-shaped cross-section. An encoder body 132 is adhered to one side of the annular supporting member 131. The encoder body 132 is formed of a rubber permanent magnet mingled with ferritic powder and has N and S poles alternately arranged along its circumference.

The cover 133 is formed from synthetic resin as a cylinder capped 133b at one end. Its cylindrical portion 133a is press-fit into the end inner circumference of the inner-side of the outer member 121 to close the opening of the outer member 121 by the capped portion 133b. As clearly shown in FIG. 26, the cylindrical portion 133a is formed with a flange 134. The flange 134 is adapted to contact with the end face of the outer member 121. This makes it possible to exactly position the entire cover 133 axially relative to the outer member 121. Thus, this easily controls the position of the sensor 139 mounted on the cover 133.

The cap portion 133b of the cover 133 is formed with a cylindrical sensor mounting portion 135. An inserting portion 139a of the sensor 139 is inserted into a sensor mounting bore 136. The cover 133 is integrally molded with a metal core of a capped cylinder configuration in a region from the inner circumference of the cylindrical portion 133a to the inner surface of the cap portion 133b. The metal core 137 includes a cylindrical portion 137a and a cap portion 137b molded in the cylindrical portion 133a, 133b of the cover 133. The cap portion 137b forms a bottom portion of the cylindrical portion 137a. An opened portion of the sensor mounting bore 136, opposing the encoder body 132, is closed by the cap portion 137b of the metal core 137.

The metal core 137 is formed from a non-magnetic steel sheet with a thickness of about 0.3 mm. The presence of the cap portion 137b increases the strength of the cover 133. The non-magnetic property of the metal core 137 does not produce a negative influence on detecting accuracy of the rotational speed.

The sensor 139 is coated with a synthetic resin and mounted on the cover 133 by inserting the inserting portion 139a into the sensor mounting bore 136. The inserting portion 139a opposes the encoder body 132 via a predetermined axial gap. Sandwiched in the cap is the cap portion 137b of the metal core 137. A detecting portion (not shown) for detecting change of magnetic field generated by rotation of the magnetic encoder 130 opposes a portion to the encoder body 132. This detecting portion can output electric signals of the sensor 139 via an output cable 138.

As described above, since the opening portion of the sensor mounting bore 136 of the cover 133 opposing the encoder body 132 is perfectly closed by the cap portion 137b of the metal core 137 of non-magnetic steel sheet and having a capped-cylinder configuration, no foreign matter can enter into the inside of the wheel bearing apparatus. Thus, excellent sealability of the entire wheel bearing apparatus exists as compared with a through bore type sensor mounting bore which is not closed by any sealing member (see e.g. Patent Document Japanese Laid-open Patent Publication No. 2000-249138 and Japanese Patent No. 4286063).

In such a wheel bearing apparatus incorporating a rotational speed detecting apparatus of the prior art, since separation or small gaps tend to be caused, due to the difference in the liner expansion coefficients resulting from temperature variation caused by thermal impact, in the joined portion between the metal core 137 and the cover 133 of the synthetic resin, i.e. joined portions between the cylindrical portions 137a and 133a as well as joined portions between the cap portions 137b and 133b of the metal core 137 and the cover 133, it is difficult to maintain the initial sealability for a long term.

SUMMARY

It is, therefore, an object of the present disclosure to provide a wheel bearing apparatus incorporating a rotational speed detecting apparatus that can solve the problems of prior art described above. Thus, the wheel bearing of the present disclosure improves the reliability of the detection of the rotational speed by protecting the magnetic encoder while improving the sealability of the fitting portion between the protecting cover and outer member. This is done by suppressing deformation of the protecting cover while increasing its rigidity.

To achieve the above mentioned objects, a wheel bearing apparatus incorporating a rotational speed detecting apparatus includes an outer member, inner member, magnetic encoder, seal and cover. The outer member inner circumference includes double row outer raceway surfaces. The inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The wheel hub and the inner ring are formed on their outer circumferences with double row inner raceway surfaces that oppose the double row outer raceway surfaces. Double row rolling elements are contained between the inner raceway surfaces and outer raceway surfaces of the inner member and outer member. The magnetic encoder is adapted to be fit onto the outer circumference of the inner ring and secured to it. The magnetic encoder has magnetic characteristics alternately and equidistantly varying along its circumferential direction. The seal is mounted on the outer-side end of the outer member. The protecting cover is mounted on the inner-side of the outer member in order to close and seal the annular openings formed between the outer member and the inner member at the end of the wheel hub. The protecting cover is formed of a non-magnetic steel sheet with a cup-shaped configuration by press working. The cover includes a cylindrical fitting portion, a shielding portion and a bottom portion. The cylindrical fitting portion is press-fit into the end inner circumference of the outer member. The donut-shaped shielding portion extends radially inward from the fitting portion, via a radially reducing portion. The inner-side surface of the shielding portion is arranged near to or in contact with a rotational speed detecting sensor. The bottom portion is continuous with the shielding portion, via a stepped portion, to close the inner-side end of the inner member. A sealing member is integrally adhered onto the outer circumference of the radially reducing portion, by vulcanizing adhesion. The sealing member includes an annular portion formed with a diameter slightly smaller than the outer diameter of the fitting portion of the protecting cover. A projected portion of the sealing member is formed with a diameter slightly larger than the outer diameter of the fitting portion of the protecting cover. The projected portion is press-fit into the end inner circumference of the outer member, via a predetermined interference.

The wheel bearing apparatus incorporating a rotational speed detecting apparatus has the protecting cover formed by press working from a non-magnetic steel sheet with a cup-shaped configuration. The cover cylindrical fitting portion is press-fit into the end inner circumference of the outer member. The donut-shaped shielding portion extends radially inward from the fitting portion, via a radially reducing portion. The inner-side surface of the shielding portion is arranged near to or in contact with a rotational speed detecting sensor. The bottom portion is continuous with the shielding portion, via a stepped portion, to close the inner-side end of the inner member. The sealing member is integrally adhered to the outer circumference of the radially reducing portion by vulcanizing adhesion. The sealing member annular portion has a diameter slightly smaller than the outer diameter of the fitting portion of the protecting cover. The projected portion has a diameter slightly larger than the outer diameter of the fitting portion of the protecting cover. The projected portion is press-fit into the end inner circumference of the outer member via a predetermined interference. Thus, it is possible to increase the rigidity of the protecting cover by providing the stepped cross-sectional configuration on the protecting cover. Thus, this suppresses deformation of the protecting cover due to impingement by pebbles, etc. In addition, since the protecting cover is formed of non-magnetic material, no adverse effect is exerted on the magnetic flux. Such an arrangement can improve the durability of the wheel bearing apparatus for a long term. Furthermore, the provision of the sealing member improves the sealability of the fitting surfaces between the outer member and the protecting cover.

The radially reducing portion may be a stepped cross-sectional configuration or a tapered cross-sectional configuration.

According to the present disclosure, the dimension of the sealing member may be determined so that the sealing member does not project toward the inner-side beyond the outer-side surface of the shielding portion under a free condition where the protecting cover has not yet been fit into the outer member. This makes it possible to position the rotational speed sensor away from the magnetic encoder more than necessary. Thus, it enables to set a minimum air gap to further improve the detecting accuracy. In this case, although it is defined that the sealing member does not project toward the inner-side beyond the outer-side surface of the shielding portion under a free condition where the protecting cover is not fit into the outer member, it is preferable that the sealing member does not project toward the inner-side beyond the outer-side surface of the shielding portion under a condition where the protecting cover has not been fit and secured in the outer member under actual use conditions.

The fitting volume of the projected portion of the sealing member is determined so that it is smaller than the volume of the annular space formed between the annular portion of the sealing member and the end inner circumference of the outer member under a condition where a press-fitting tool contacts the sealing member. This makes it possible to prevent the sealing member from being damaged due to the projection of the sealing member from the end face of the outer member since the annular portion of the sealing member provides an "escaping space" for the projected portion when it is compressed during press-fitting of the protecting cover.

The compression ratio of the projected portion of the sealing member is limited to 45% or less. This makes it possible to make the press-fitting work easy. Thus, this prevents the sealing member from being damaged. In addition, it is possible to maintain the elasticity of the material of the sealing member and thus improve the sealability of the sealing member.

The inner-side end face of the outer member is formed so that it slightly projects toward the inner-side than the larger end face of the inner ring. This makes it possible to prevent the protecting cover from contacting the inner ring.

The detecting surface of the magnetic encoder is positioned at the same position as that of the larger end face of the inner ring or at a position slightly projected toward the inner-side than the larger end face of the inner ring. This makes the air gap adjustment easy and thus the air gap smaller.

The transitional portion between the end inner circumference and the chamfered portion of the outer member is formed as a circular arc. The circular arc has a predetermined radius of curvature. This makes it possible to improve the press-fitting ability of the sealing member. Thus, this prevents damage and uplift of the sealing member during the press-fitting work.

The end inner circumference of the outer member as well as the chamfered portion, including at least the transitional portion, are simultaneously ground by a formed grinding stone. This forms a smooth formation of the transitional portion between the end inner circumstance and the chamfered portion of the outer member. Thus, this further improves the press-fitting ability of the sealing member and prevents damage and uplift of the sealing member during the press-fitting work.

The sheet thickness of the shielding portion of the protecting cover is thinner than the sheet thickness of other portions. This enables the air gap between the detecting portion of the sensor and the magnetic encoder to be set small. Further, this improves the detecting accuracy.

The protecting cover is formed of non-magnetic austenitic stainless steel sheet. This makes it possible to provide a wheel bearing apparatus that does not exhibit adverse effects on the magnetic flux. Also, it can improve the durability of the wheel bearing apparatus for a long term.

A cup-shaped sensor cap is fit into the inner-side end of the outer member. The rotational speed sensor is mounted on the sensor cap. The rotational speed sensor opposes the magnetic encoder via a predetermined axial air gap. This improves the sealability of the wheel bearing apparatus.

The amplitude of chatter vibration of the fitting surface of end inner circumference of the outer member is limited to 3 µm or less. This makes it possible to assure the sealability of the metal-to-metal fitting portion even if the elastic member, such as synthetic rubber, would be damaged due to corrosion. Further, this improves the sealability of the fitting portion.

The sensor cap includes a cylindrical fitting portion to be fit into the end of the outer member. The bottom portion extends radially inward from the fitting portion. The rotational speed sensor is mounted horizontally to the road surface in a fitting bore formed in the bottom portion. This makes it possible to suppress change in air gap between the rotational speed sensor and the pulser ring even if the outer member and the inner member are inclined to each other due to a lateral load applied by a wheel. Thus, this obtains a stable detecting accuracy.

The sensor cap includes a cap body and a metal core. The cap body is formed of synthetic resin by injection molding. The cap body includes a cylindrical fitting portion that is press-fit into the inner-side end inner circumference of the outer member. A bottom portion extends radially inward from the fitting portion, via a stepped portion. The bottom portion is in intimate contact with the inner-side end face of the outer member. The metal core is integrally molded with the cap body at the opening portion.

The fitting portion of the sensor cap is press-fit onto the end outer circumference of the outer member. An annular groove is formed on the end outer circumference of the outer member. The end of the fitting portion of the sensor cap is caulked in the annular groove. This makes it possible to prevent axial slip-off of the sensor cap due to repeated deformation of the fitting portion. Thus, this maintains the original air gap. In addition, the provision of caulking of the sensor cap enables an increase in its gripping force against slip-off. Thus, this also reduces the thickness of the end of the outer member. This contributes to a reduction of the weight of the wheel bearing apparatus.

A drain is formed on the corner between the fitting portion and the bottom portion of the sensor cap at a side near the road surface. This makes it possible to effectively exhaust foreign matters from the drain formed on the bottom corner of the sensor cap. It enables the foreign matter to fluidly fall within the sensor cap even when foreign matter, such as rain water from the outside, enters into the sensor cap.

A through bore is formed on the bottom portion of the sensor cap at or near the center. A securing nut is press-fit into the through bore from the outer-side of the bottom portion. The rotational speed sensor is secured by fastening a mounting bolt into the securing nut. This easily secures the rotational speed sensor only by fastening of the securing nut. In this case, if the securing nut is formed with an anti-rotation means, such as an axial groove, it will be advantageous against nut slippage during fastening of the mounting bolt.

The sensor cap is formed from stainless steel sheet. This improves the corrosion resistance of the fitting portion, between the sensor cap and the outer member, and the sensor mounting portion for a long term.

The sensor cap is formed from cation electro deposited steel sheet or preserved steel sheet. This also improves the corrosion resistance of the fitting portion, between the sensor cap and the outer member, and the sensor mounting portion for a long term.

A securing nut is embedded in the mounting portion of the sensor cap. The rotational speed sensor is secured by fastening a mounting bolt into the securing nut. This makes it possible to mount the rotational speed sensor under a condition where the inside of the bearing is closed by the sensor cap. Thus, this improves the sealability of the bearing.

The inner-side end face of the securing nut is positioned so that it is flush with the end face of the mounting portion or is slightly projected. This improves the sealability due to the intimate contact of the end faces of the securing bolt and nut in fastening of them to increase the fastening force.

The securing nut is formed from stainless steel. This prevents the generation of corrosion for a long term and thus improves the durability of the wheel bearing.

The pitch circle diameter of the outer-side row of rolling elements of the double row rolling elements is set larger than the pitch circle diameter of the inner-side row of rolling elements. The diameter of the outer-side row of rolling element of the double row rolling elements is set smaller than the diameter of the inner-side row of rolling element. The number of the outer-side row of rolling element of the double row rolling elements is set larger than the number of the inner-side row of rolling element. This increases the bearing rigidity of the outer-side as compared with that of the inner-side. Thus, this extends the life of the bearing as well as increases the rigidity of bearing while suppressing the outer-side outer diameter of the outer member.

The wheel bearing apparatus incorporating a rotational speed detecting apparatus of the present disclosure comprises an outer member integrally formed with double row outer raceway surfaces on its inner circumference. An inner member includes a wheel hub and at least one inner ring. The wheel hub is integrally formed on one end with a wheel mounting flange. A cylindrical portion axially extends from the wheel mounting flange. The inner ring is press fit onto the cylindrical portion of the wheel hub. The wheel hub and the inner ring are formed with double row inner raceway surfaces, on their outer circumference, that oppose the double row outer raceway surfaces. Double row rolling elements are contained between the inner raceway surfaces and outer raceway surfaces of the inner member and outer member. A magnetic encoder is adapted to be fit onto the outer circumference of the inner ring and secured to it. The magnetic encoder has magnetic characteristics alternately and equidistantly varying along its circumferential direction. A seal is mounted on the outer-side end of the outer member. A protecting cover is mounted on the inner-side of the outer member. The seal and cover close and seal annular openings formed between the outer member and the inner member at their ends. The protecting cover is formed of non-magnetic steel sheet. The protective cover has a cup-shaped configuration formed by press working. The protective cover has a cylindrical fitting portion press-fit into the end inner circumference of the outer member. A donut-shaped shielding portion extends radially inward from the fitting portion, via a radially reducing portion. The inner-side surface of the shielding portion is arranged near to or contact with a rotational speed detecting sensor. A bottom portion is continuous with the shielding portion, via a stepped portion, to close the inner-side end of the inner member. A sealing member is integrally adhered to the outer circumference of the radially reducing portion by vulcanizing adhesion. The sealing member has an annular portion formed with a diameter that is slightly smaller than the outer diameter of the fitting portion of the protecting cover. A projected portion is formed with a diameter slightly larger than the outer diameter of the fitting portion of the protecting cover. The projected portion is press-fit into the end inner circumference of the outer member, via a predetermined interference. Thus, it is possible to increase the rigidity of the protecting cover by providing the stepped cross-sectional configuration on the protecting cover. Thus, this suppresses the deformation of the protecting cover due to the impingement of pebbles, etc. In addition, since the protecting cover is formed of non-magnetic material, an adverse effect is not exhibited on the magnetic flux and superior anti-corrosion is exhibited. Furthermore, the provisions of the sealing member improve the sealability of the fitting surfaces between the outer member and the protecting cover.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2(*b*) is a partially enlarged view of a modification of FIG. 2(*a*).

DETAILED DESCRIPTION

A wheel bearing apparatus incorporating a rotational speed detecting apparatus comprises an outer member with an integrally formed body mounting flange on its outer circumference to be mounted on a knuckle. The outer member inner circumference includes double row outer raceway surfaces. An inner member includes a wheel hub and an inner ring. The wheel hub is integrally formed on one end with a wheel mounting flange. One row inner raceway surface is on the wheel hub. The inner raceway surface opposes one of the double row outer raceway surfaces. A cylindrical portion axially extends from the wheel mounting flange. The inner ring is press-fit onto the cylindrical portion of the wheel hub. The other inner raceway surface is on the inner ring and it opposes the other double row outer raceway surface. Double row rolling elements are contained between the inner and outer raceway surfaces of the inner and outer members. A magnetic encoder is fit onto the outer circumference of the inner ring. The inner ring is axially secured to the wheel hub by a caulked portion. The caulked portion is formed by plastically deforming the end of the cylindrical portion of the wheel hub under a condition where a predetermined bearing pre-pressure is applied to the inner ring. A seal is mounted on the outer-side end of the outer member. A protecting cover is mounted on the inner-side of the outer member. The cover and seal close and seal annular openings formed between the outer member and the inner member at their ends. The protecting cover is formed from a non-magnetic steel sheet with a cup-shaped configuration by press working. The cover includes a cylindrical fitting portion press-fit into the end inner circumference of the outer member. A donut-shaped shielding portion extends radially inward from the fitting portion, via a radially reducing portion. The inner-side surface of the shielding portion is arranged near to or in contact with a rotational speed detecting sensor. A bottom portion is continuous with the shielding portion via a stepped portion to close the inner-side end of the inner member. A sealing member is integrally adhered to the outer circumference of the radially reducing portion by vulcanizing adhesion. The sealing member includes an annular portion formed with a diameter slightly smaller than the outer diameter of the fitting portion of the protecting cover. A projected portion is formed with a diameter slightly larger than the outer diameter of the fitting portion of the protecting cover. The projected portion is press-fit into the end inner circumference of the outer member via a predetermined interference.

A preferred embodiment of the present disclosure will be described with reference to the accompanied drawings.

Figure 1:
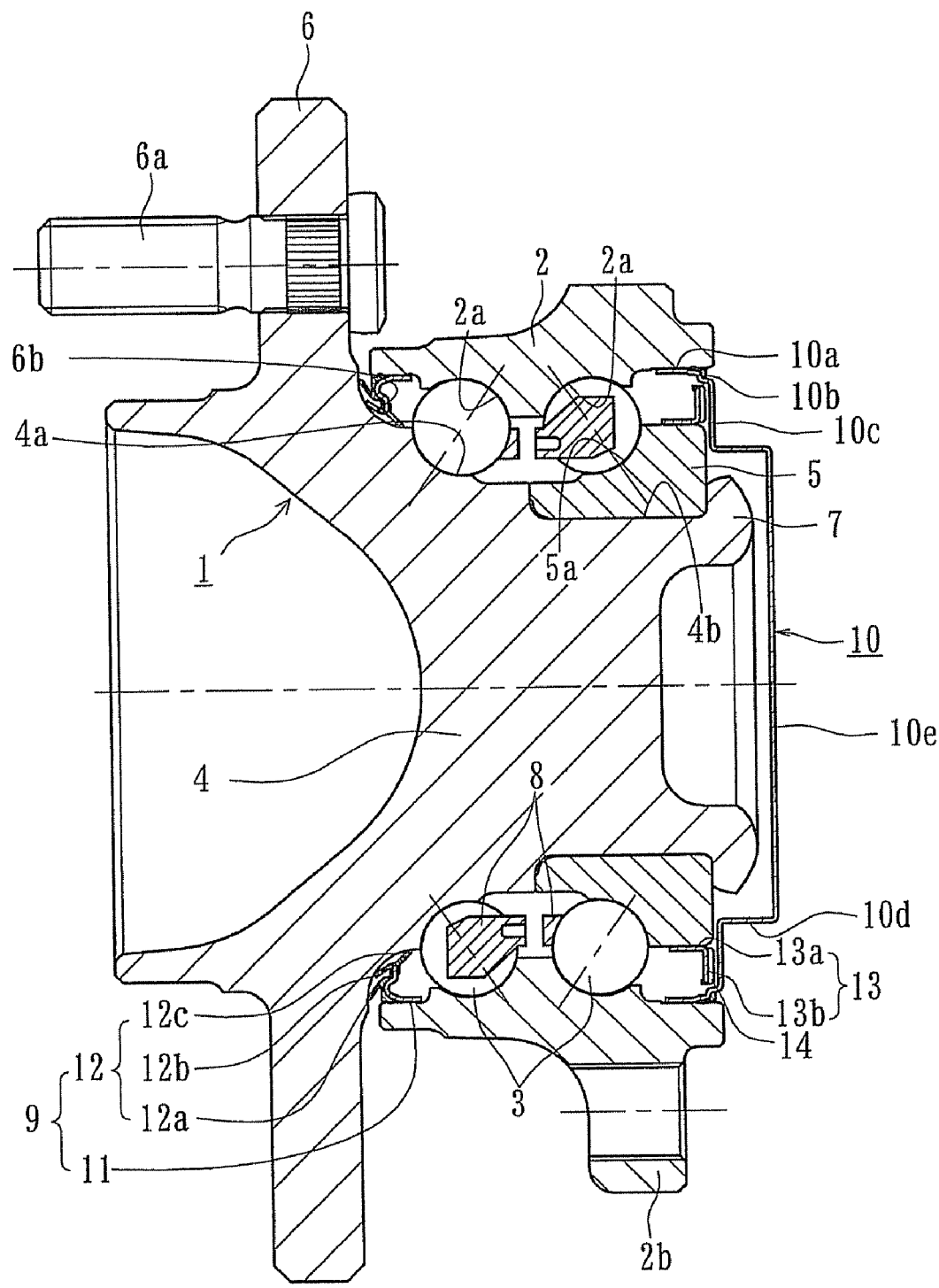
FIG. 1 is a longitudinal-section view of a first embodiment of a wheel bearing apparatus incorporating a rotational speed detecting apparatus.
Figure 2:
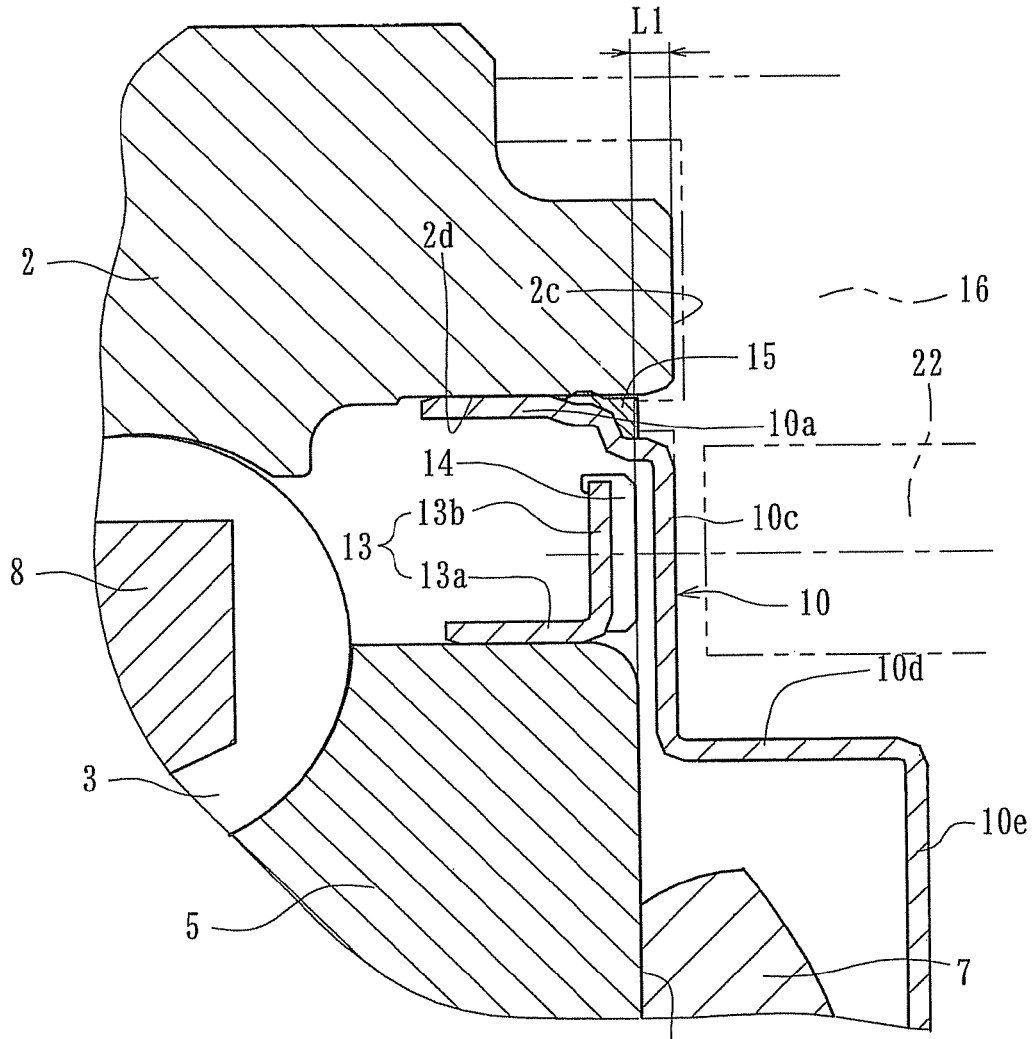
FIG. 2(*a*) is a partially enlarged view of FIG. 1.
Figure 2:
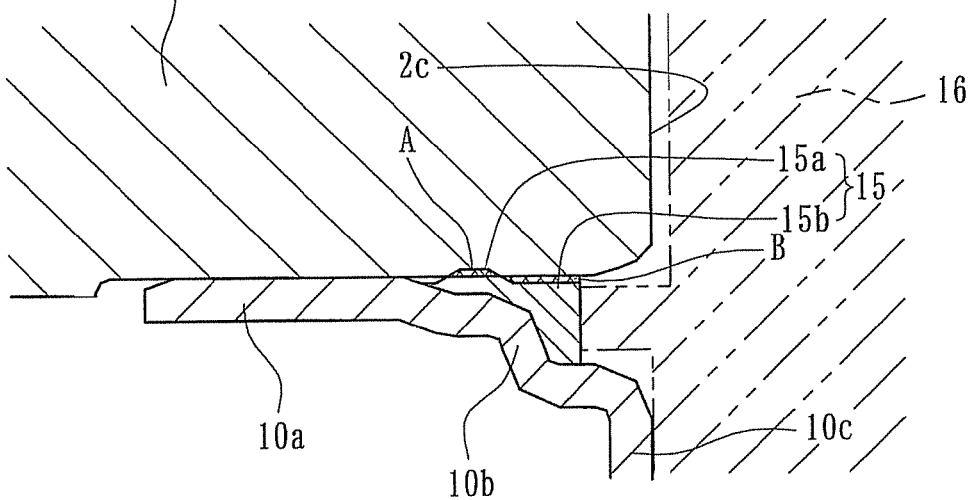
Figure 3:
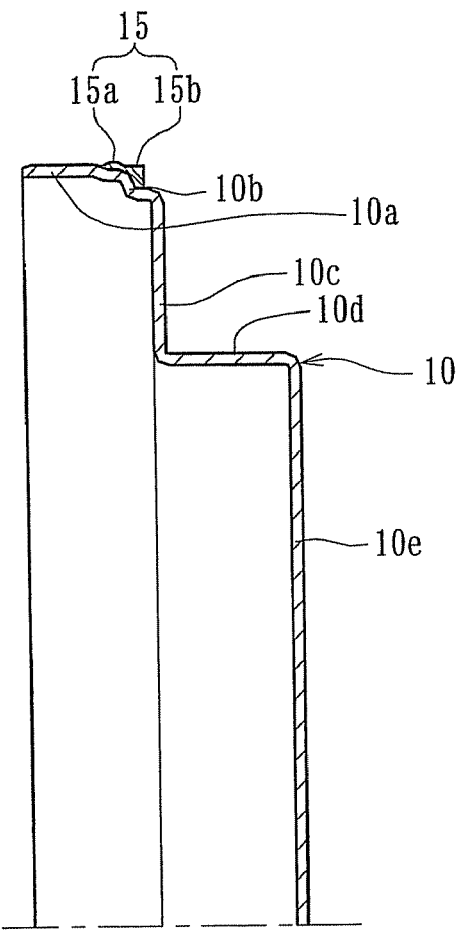
FIG. 3 is a longitudinal-section view of a protecting cover.
Figure 4:
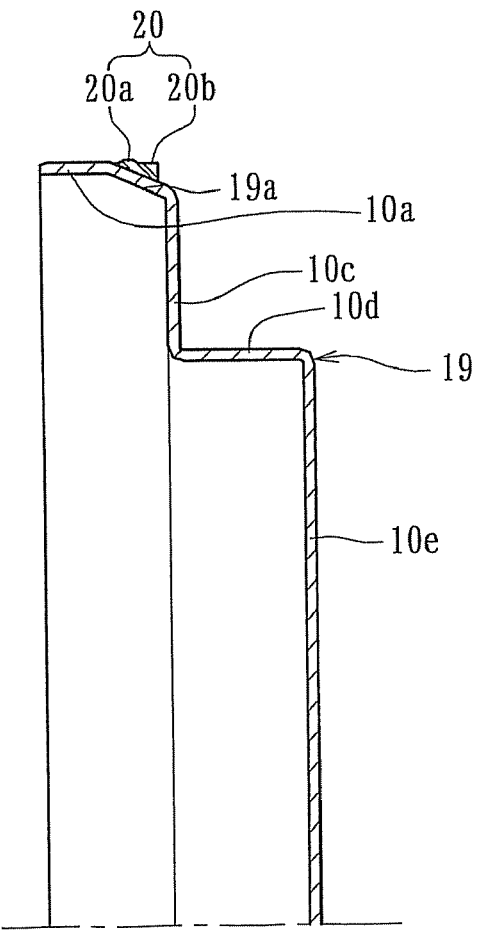
FIG. 4 is a longitudinal-section view of a modification of the protecting cover of FIG. 3.
Figure 5:
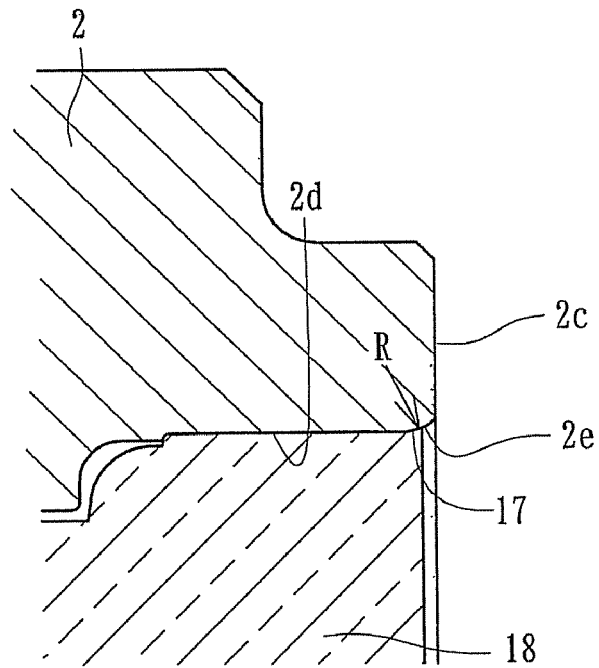
FIG. 5 is an explanatory view of a method of forming the outer member.

FIG. 1 is a longitudinal-section view of a first embodiment of a wheel bearing apparatus incorporating a rotational speed detecting apparatus. FIG. 2(a) is a partially enlarged view of FIG. 1. FIG. 2(b) is a partially enlarged view of FIG. 2(a). FIG. 3 is a longitudinal-section view of a protecting cover. FIG. 4 is a longitudinal-section view of a modification of the protecting cover of FIG. 3. FIG. 5 is an explanatory view of a method of forming the outer member. In the description below, an outer-side of a bearing apparatus, when it is mounted on a vehicle, is referred to as the "outer-side" (a left side in a drawing). An inner-side of the bearing apparatus, when it is mounted on a vehicle, is referred to as the "inner side" (a right side in a drawing).

The wheel bearing apparatus incorporating a rotational speed detecting apparatus of the present disclosure is a so-called "third generation" type for a driven wheel. It includes an inner member 1, an outer member 2, and double row rolling elements (balls) 3, 3 between the inner and outer members 1 and 2. The inner member 1 includes the wheel hub 4 and an inner ring 5 press-fit onto the wheel hub 4, via a predetermined interference.

The outer member 2 is formed from medium-high carbon steel such as S53C including carbon of 0.40~0.80% by weight. Its outer circumference includes a body mount flange 2b adapted to be mounted on a knuckle (not shown). It inner circumference includes double row outer raceway surfaces 2a, 2a. These double row outer raceway surfaces 2a, 2a are hardened by high frequency induction hardening to have a surface hardness of 58~64 HRC.

The wheel hub 4 is integrally formed, on its outer-side end, with a wheel mount flange 6 to mount a wheel (not shown). Hub bolts 6a are secured on the wheel mounting flange 6 at circumferentially equidistant positions. In addition, the wheel hub 4 is formed, on its outer circumference, with one (outer-side) inner raceway surface 4a. A cylindrical portion 4b axially extends from the inner raceway surface 4a. The inner ring 5 is press-fit, via a predetermined interference, onto the cylindrical portion 4b. The inner ring 5 is axially secured on the wheel hub 4 by a predetermined bearing pre-pressure applied by a caulked portion 7. The caulked portion 7 is formed by plastically deforming the end of the cylindrical portion 4b radially outward. An inner-side inner raceway surface 5a is formed on the outer circumference of the inner ring 5.

The double row rolling elements 3, 3 are contained between the double row outer raceway surfaces 2a, 2a of the outer member 2 and the double row inner raceway surfaces 4a, 5a. The rolling elements 3, 3 are rollably held by cages 8, 8. Annular openings are formed between the outer member 2 and the inner member 1. A seal 9 is mounted on the outer-side opening. A magnetic encoder 14 and protecting cover 10 are mounted on the inner-side opening. The seal and cover close and seal annular openings to prevent leakage of lubricating grease sealed within the bearing and the entry of rain water or dust from the outside into the bearing.

Although it is shown that the wheel bearing apparatus includes a double row angular contact ball bearing using balls as the rolling elements 3, the present disclosure is not limited to such a bearing. A double row tapered roller bearing using tapered rollers as rolling elements 3 may be used. In addition, although it is shown as a third generation type bearing, the present disclosure can be applied to first and second generation type bearings (not shown) where a pair of inner rings is press-fit onto the wheel hub.

The wheel hub 4 is made of medium-high carbon steel such as S53C including carbon of 0.40~0.80% by weight. It is hardened by high frequency induction hardening to have a surface hardness of 58~64 HRC over the inner raceway surface 4a and a region from an inner-side base 6b of the wheel mounting flange 6 to the cylindrical portion 4b. The caulked portion 7 is not hardened and kept to a hardness after forging. This enables the caulking work to be easy. Also, it prevents the generation of micro cracks during machining. In addition, not only the frictional resistance of the base 6b forming a seal land portion of the seal 9 can be improved but the durability of the wheel hub 4 can be also improved due to an increase of mechanical strength against rotary bending applied to the wheel mounting flange 6. The inner ring 5 and the rolling elements 3 are formed of high carbon chrome steel such as SUJ2 and are dip hardened to their cores to have a hardness of about 58~64 HRC.

Seal 9 is formed as an integrated seal with a metal core 11 press-fit into the outer-side end of the outer member 2, via a predetermined interface. A sealing member 12 is adhered to the metal core 11. The metal core 11 is press-formed from cold rolled steel sheet (JIS SPCC etc.)

The sealing member 12 is formed of synthetic rubber such as nitrile rubber. It is integrally adhered to the metal core 11 via vulcanized adhesion. The sealing member 12 includes a side lip 12a inclined radially outward and slide-contacting with the inner-side surface of the wheel mounting flange 6, via a predetermined interference. A side lip 12b slidably contacts with the base 6b of circular arc cross-section via a predetermined interference. Grease lips 12c are inclined toward the inside of the wheel bearing.

An annular supporting member 13, with an L-shaped cross-section, is press-fit onto the outer circumference of the inner ring 5. The supporting member 13 includes a cylindrical portion 13a press-fit onto the outer circumference of the inner ring 5. A standing portion 13b extends radially outward from the cylindrical portion 13a. A magnetic encoder 14 is integrally adhered to the inner-side surface of the standing portion 13b, by vulcanizing adhesion. The magnetic encoder 14 is formed from an elastomer, such as synthetic rubber, where ferritic magnetic powder is mingled so that N and S poles are alternately arranged along its circumference.

The annular supporting member 13 is formed of a steel plate such as ferritic stainless steel sheet (JIS SUS 430 etc.) or preserved cold rolled steel sheet (JIS SPCC etc.) by press working. Accordingly, it is possible to prevent the generation of corrosion on the supporting member 13 and to assure a magnetic output of the magnetic encoder 14 with a strong and stable detecting accuracy.

A protecting cover 10, mounted on the inner-side end of the outer member 2, is formed of non-magnetic austenitic stainless steel sheet (JIS SUS 304 etc.) by press working to have a dish-shaped configuration. As shown in FIGS. 2(a) and 3, the protecting cover 10 includes a cylindrical fitting portion 10a press-fit into the end inner circumference of the outer member 2. A donut-shaped shielding portion 10c extends radially inward from the fitting portion 10a via a radially reducing portion 10b. A bottom portion 10e is continuous with the shielding portion 10c, via a stepped portion to close the inner-side end of the inner member 1. The detecting portion of a sensor (not shown) is arranged near to or in contact with the shielding portion 10c of the protecting cover 10 opposite to the magnetic encoder 14, at a predetermined air gap (axial gap), via the protecting cover 10. Such a stepped cross-sectional configuration increases the rigidity of the protecting cover 10. Thus, this suppresses deformation of the protecting cover 10 due to impingement of pebbles, etc. In addition, since the protecting cover 10 is formed of a non-magnetic material, no adverse effects are caused on the magnetic flux.

According to this embodiment, the radially reducing portion 10b has a stepped cross-sectional configuration. A sealing member 15 is secured to the outer circumference of the radially reducing portion 10b. The sealing member 15 is formed of synthetic rubber such as NBR (acrylonitrile-butadiene rubber). It is integrally adhered to the protecting cover 10 by vulcanizing adhesion. The sealing member 15 includes a projected portion 15a and an annular portion 15b. The annular portion 15b is formed with a diameter slightly smaller than the outer diameter of the fitting portion 10a. The projected portion 15a is formed with a diameter slightly larger than the outer diameter of the fitting portion 10a. The projected portion 15a is press-fit into the end inner circumference 2d of the outer member 2, via a predetermined interference. The sealing member 15 improves the sealability of the fitting surfaces between the outer member 2 and the protecting cover 10.

As shown in FIG. 2(b), the compression ratio of the projected portion 15a of the sealing member 15 is limited to 45% or less. Thus, the fitting volume A of the projected portion 15a of the sealing member 15 is smaller than the volume B of the annular space formed between the annular portion 15b of the sealing member 15 and the end inner circumference of the outer member 2 under a condition where a press-fitting tool 16 is in contact with the sealing member 15 (shown by cross-hatching). This makes it possible to prevent the sealing member 15 from being damaged due to projection of the sealing member 15 from the end face 2c of the outer member 2. The annular portion 15b of the sealing member 15 provides an "escaping space" for the projected portion when it is compressed during press-fitting of the protecting cover 10.

In this case, it is undesirable for the compression ratio of the projected portion 15a of the sealing member to exceed 45%. This is due to the fact that there is a risk that the press-fitting work would be difficult and that the elasticity of material forming the sealing member 15 would be extremely detracted. Also, the sealability would be detracted while being damaged during its press-fitting.

Also according to this embodiment, the inner-side end face 2c of the outer member 2 is formed so that it projects, by a length L1, further toward the inner-side than the larger end face 5b of the inner ring 5. In addition, it is set so that the shielding portion 10c of the protecting cover 10 and the end face 2c of the outer member 2 are positioned substantially along the same plane. Also, the detecting surface of the magnetic encoder 14 and the larger end face 5b of the inner ring 5 are positioned along substantially the same plane. This makes it possible to prevent the protecting cover 10 from contacting the inner ring 5. In addition, if the detecting surface of the magnetic encoder 14 and the larger end face 5b of the inner ring 5 are positioned substantially along the same plane or the detecting surface of the magnetic encoder 14 slightly projects further toward the inner-side than the larger end face 5b of the inner ring 5, it is possible to achieve easy air gap adjustment and thus improve the detecting accuracy.

A method for forming the outer member 2 will be described using FIG. 5. According to this embodiment, a transition portion 17, between the end inner circumference 2d and the chamfered portion 2e of the outer member 2, is formed as a circular arc with a predetermined radius of curvature R. The end inner circumference 2d of the outer member 2 as well as the chamfered portion 2e, including at least the transitional portion 17, are simultaneously ground by a formed grinding stone 18. This forms a smooth formation of the transitional portion 17 between the end inner circumstance 2d and the chamfered portion 2e of the outer member 2. Thus, this further improves the press-fitting ability of the sealing member 15 and prevents damage and uplifting of the sealing member 15 during the press-fitting work.

FIG. 4 shows a modification of the protecting cover 10 described above. This protecting cover 19 is basically only different in the configuration of the radially reducing portion. Thus, the detailed description will be omitted and the same reference numerals are used to designate the same structural element.

The protecting cover 19 is press-formed of non-magnetic austenitic stainless steel sheet (JIS SUS304 etc.) with a dish-shaped configuration. It includes a cylindrical fitting portion 10a press-fit into the end inner circumference of the outer member 2. A donut-shaped shielding portion 10c extends radially inward, via the radially reducing portion 19a, from the fitting portion 10a. A bottom portion, closing the inner-side end portion, extends from the shielding portion 10c, via a cylindrical portion 10d. Similarly to the stepped cross-sectional configuration of the protecting cover 10 described above, the stepped cross-sectional configuration on the protecting cover 19 can suppress deformation of the protecting cover due to impingement of pebbles, etc. In addition, since the protecting cover 19 is formed of non-magnetic material, no adverse effects are caused on the magnetic flux. Furthermore, the non-magnetic austenitic stainless steel sheet forming the protecting cover 19 can improve the corrosion resistance and durability for a long term.

The radially reducing portion 19a has a tapered cross-sectional configuration. A sealing member 20 is integrally adhered to the tapered portion by vulcanizing adhesion. The fitting volume of the projected portion 20a of the sealing member 20 is determined so that it is smaller than the volume of the annular space formed between the annular portion 20b of the sealing member 20 and the end inner circumference of the outer member (not shown) under a condition where a press-fitting tool (not shown) contacts the sealing member 20. Since the radially reducing portion 19a of the protecting cover 19 is formed as a tapered configuration, it can easily be set so that the fitting interference necessary to assure the sealability without excessively increasing the compression ratio of the projected portion 20a is achieved.

Figure 6:
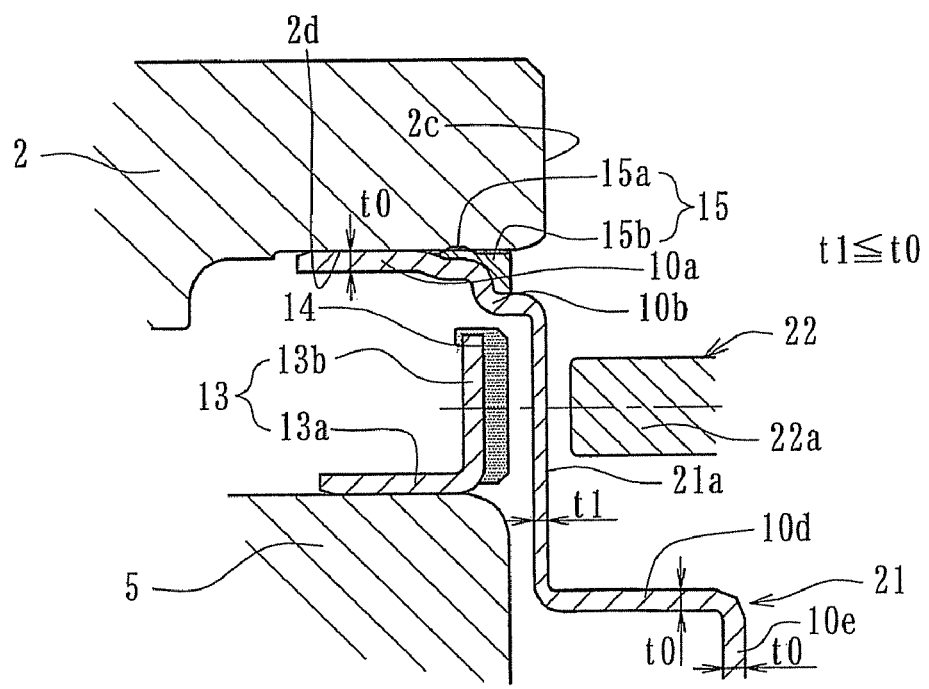
FIG. 6 is a partially enlarged view of a modification of the protecting cover of FIG. 2(a).

A protecting cover 21 shown in FIG. 6 includes a cylindrical fitting portion 10a press-fit into the end inner circumference 2d of the outer member 2. A shielding portion 21a extends radially inward from the fitting portion 10a, via a radially reducing portion 10b of a stepped cross-sectional configuration. A bottom portion 10e, closing the inner-side end portion of the inner member 1, extends from the shielding portion 21a, via a cylindrical portion 10d. The detecting portion 22a of the rotational speed sensor 22 is arranged near to or in contact with the shielding portion 21a of the protecting cover 21. The detecting portion 22a and the magnetic encoder 14 are arranged opposite to each other via the shielding portion 21a at a predetermined air gap.

The rotational speed sensor 22 includes an IC circuit incorporated with a Hall element, a magnetic resistance element (MR element) etc., and a waveform shaping circuit for shaping the output waveform of the magnetic detecting element. It forms the ABS of an automobile to detect the rotational speed of a wheel and to control it.

According to this embodiment, the sheet thickness t1 of the shielding portion 21a of the protecting cover 21 is thinner than the sheet thickness t0 of other portions. The fitting portion 10a, the radially reducing portion 10b, cylindrical portion 10d and the bottom portion 10e are thicker. This enables setting of the air gap between the detecting portion 22a of the sensor 22 and the magnetic encoder 14 to be small and further improves the detecting accuracy.

It is believed that the rotational speed sensor 22 would contact the sealing member 15 before the sensor 22 has been arranged near the shielding portion 21a of the protecting cover 21 according to the diameter or position of arrangement of the sensor 22. Thus, the dimension of the sealing member 15 is determined so that the sealing member 15 does not project toward the inner-side beyond the outer-side surface of the shielding portion 21a under a free condition where the protecting cover 21 has not yet been fit into the outer member 2. This makes it possible to position the rotational speed sensor away from the magnetic encoder 14 more than necessary and thus to set a minimum air gap to further improve the detecting accuracy. In this case, although it is defined that the sealing member 15 does not project toward the inner-side beyond the outer-side surface of the shielding portion 21a under a free condition where the protecting cover 21 has not yet been fit into the outer member 2. Thus, it is preferable that the sealing member 15 does not project toward the inner-side beyond the outer-side surface of the shielding portion 21a under a condition where the protecting cover 21 is fit and secured in the outer member 2 (i.e. under an actually used condition).

Figure 7:
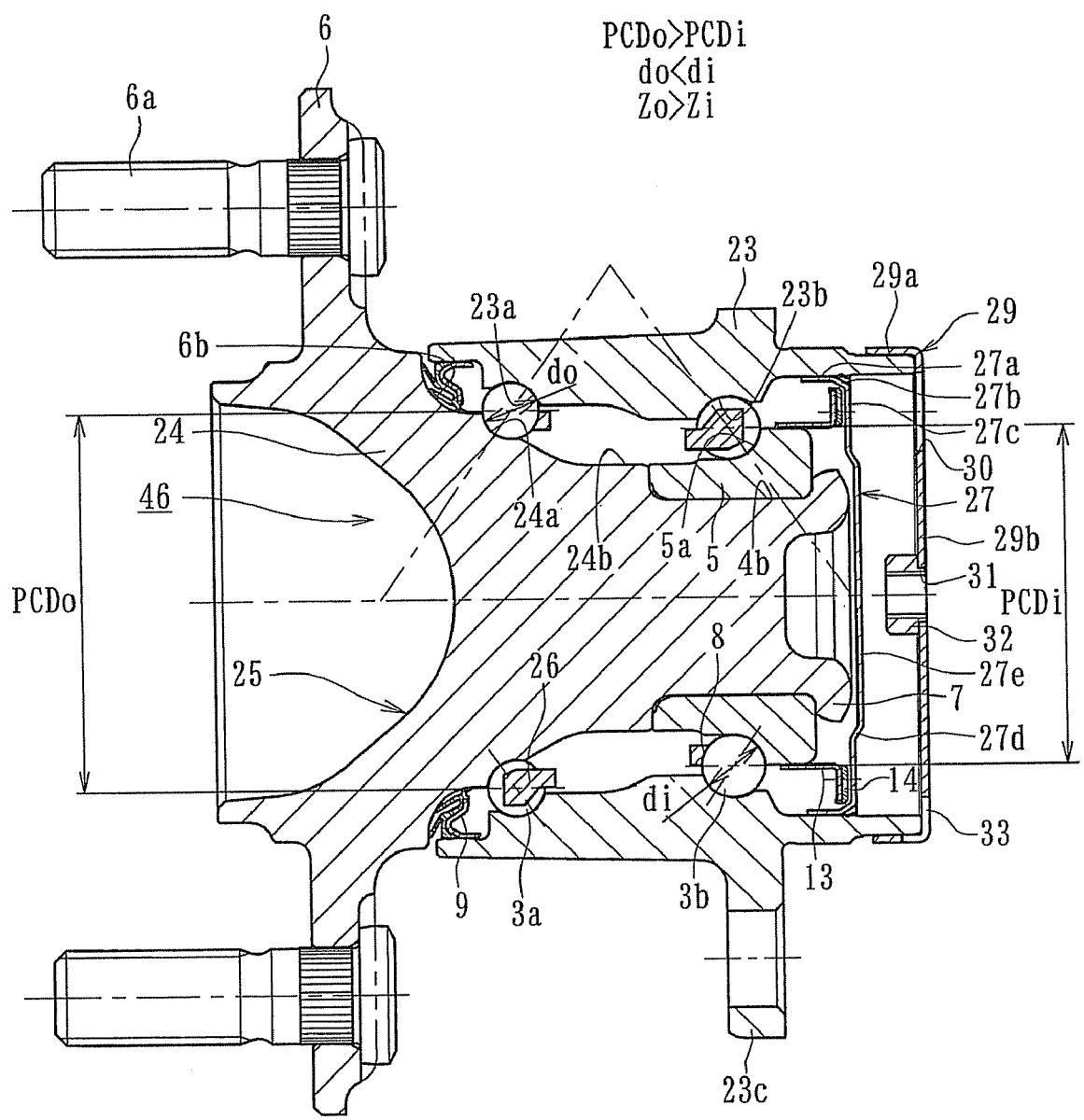
FIG. 7 is a longitudinal-section view taken along a line VII-VII showing a second embodiment of a wheel bearing apparatus incorporating a rotational speed detecting apparatus.
Figure 8:
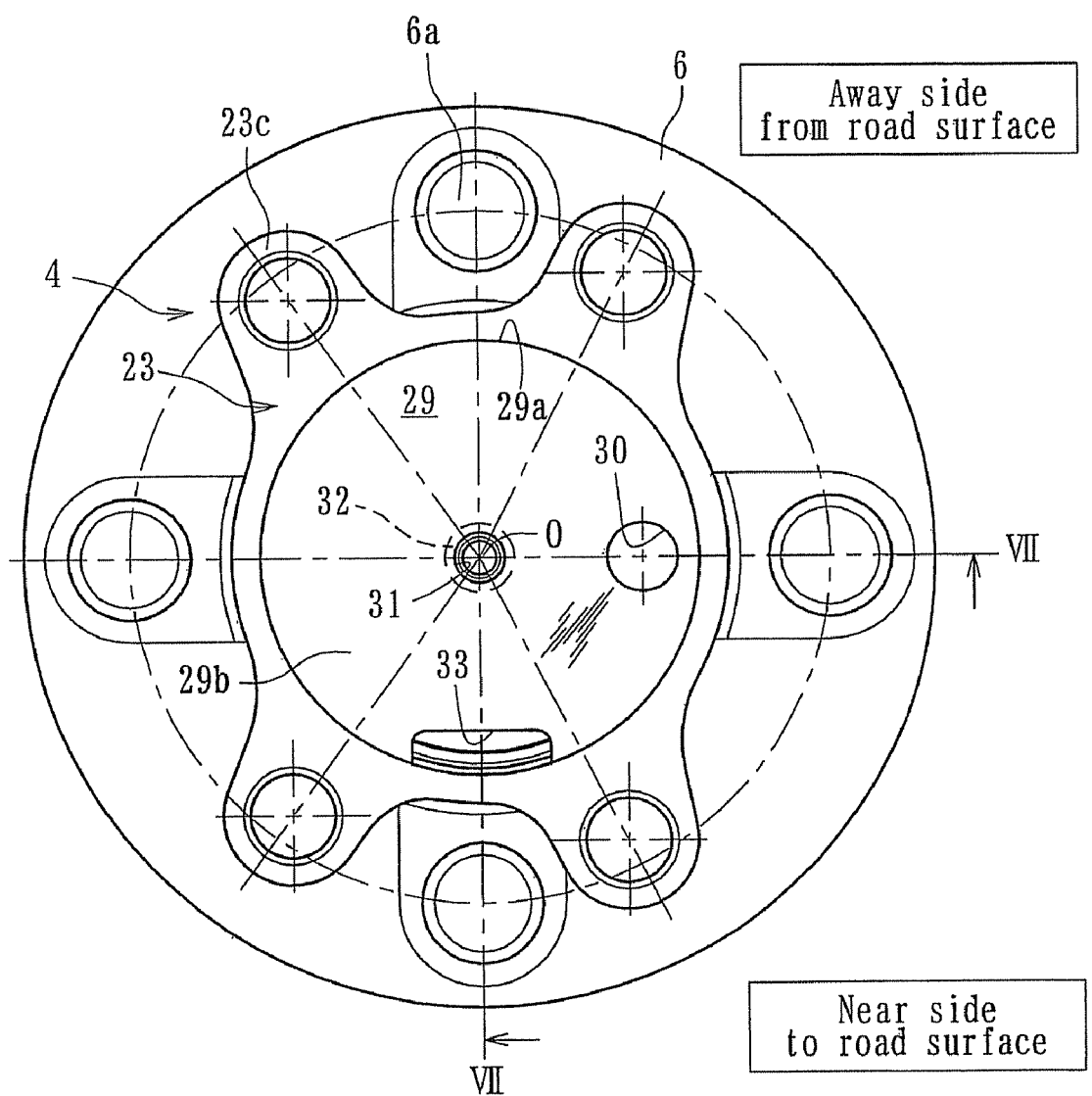
FIG. 8 is a side elevation view of FIG. 7.
Figure 9:
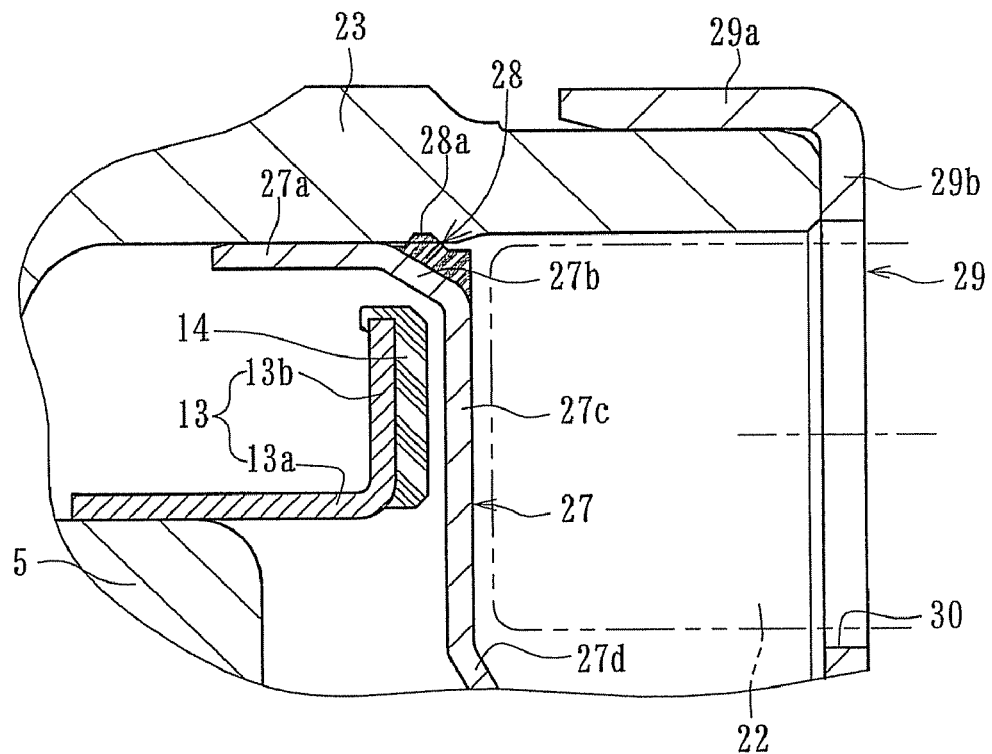
FIG. 9 is a partially enlarged view of the detecting portion of FIG. 7.
Figure 10:
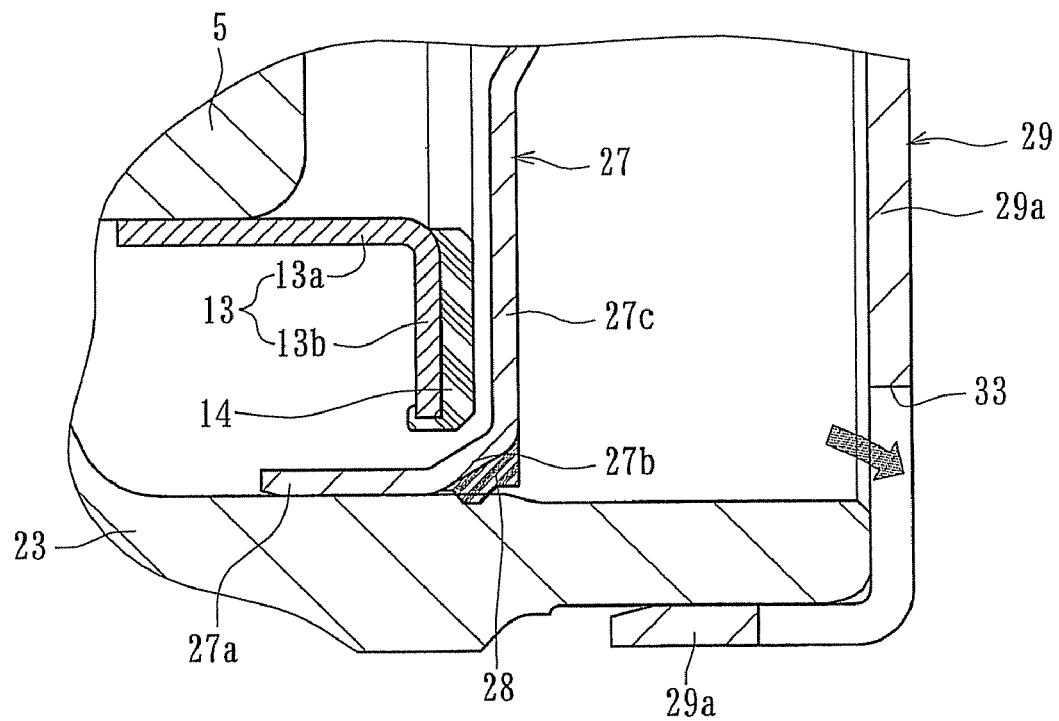
FIG. 10 is a partially enlarged view of the drain portion of FIG. 7.
Figure 11:
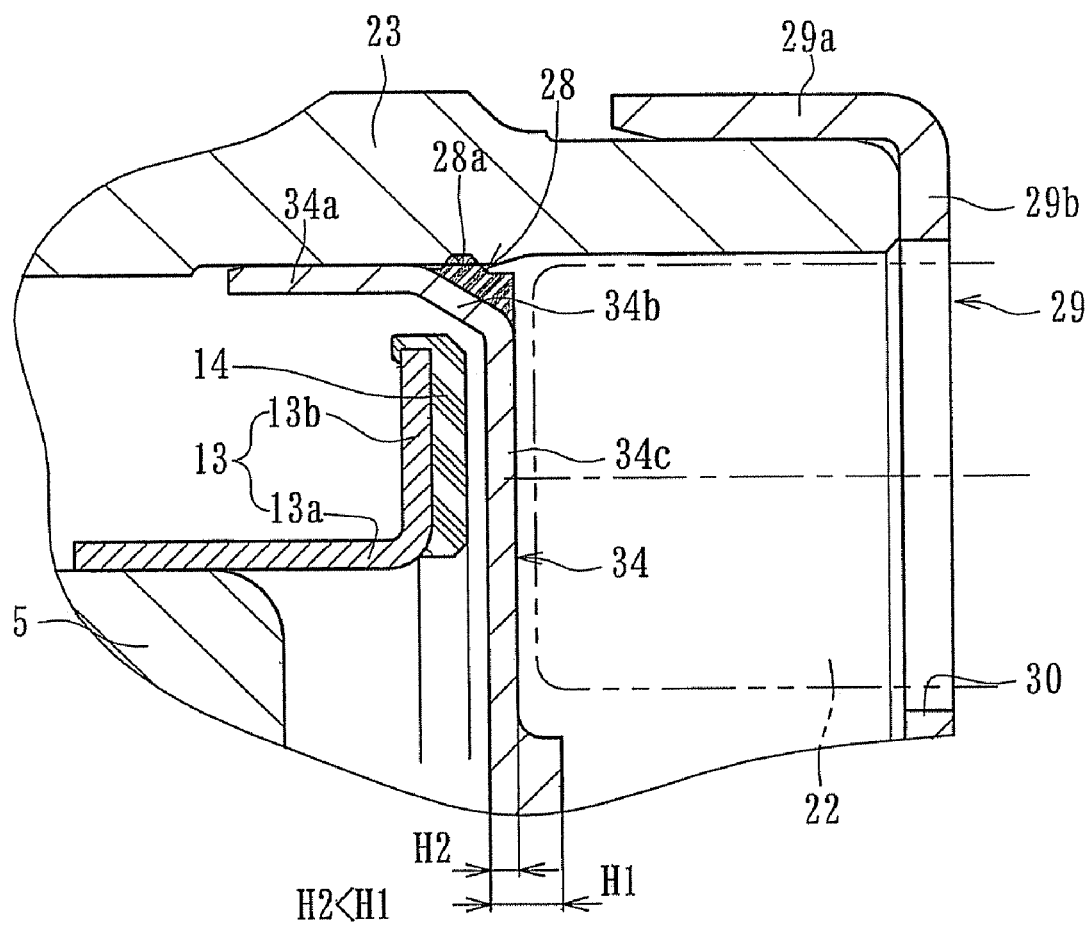
FIG. 11 is a partially enlarged view of a modification of FIG. 9.

FIG. 7 is a longitudinal-section view taken along a line VII-VII showing a second embodiment of a wheel bearing apparatus incorporating a rotational speed detecting apparatus. FIG. 8 is a side elevation view of FIG. 7. FIG. 9 is a partially enlarged view of the detecting portion of FIG. 7. FIG. 10 is a partially enlarged view of the drain portion of FIG. 7. FIG. 11 is a partially enlarged view of a modification of FIG. 9. The same reference numerals are used as those used to designate the same or similar parts in the first embodiment (FIG. 1).

This wheel bearing apparatus incorporating a rotational speed detecting apparatus of the present disclosure is a so-called "third generation" type for a driven wheel. It includes an inner member 46, an outer member 23, and double row rolling elements (balls) 3a, 3b between the inner and outer members 46 and 23. The inner member 46 includes the wheel hub 24 and an inner ring 5 press-fit onto the wheel hub 24 via a predetermined interference.

The wheel hub 24 is integrally formed, on its outer-side end, with a wheel mount flange 6 to mount a wheel (not shown). The wheel hub 24 outer circumference includes one (outer-side) inner raceway surface 24a. A cylindrical portion 4b axially extends from the inner raceway surface 24a. The inner ring 5 is press-fit onto the cylindrical portion 4b.

An axially extending cup-shaped recess 25 is formed on the outer-side end of the wheel hub 24. This recess 25 is formed by forging and extends to near the bottom of the outer-side inner raceway surface 24a. Thus, a wall thickness of the outer-side portion of the wheel hub 24 is substantially uniform.

The wheel hub 24 is made of medium-high carbon steel such as S53C including carbon of 0.40~0.80% by weight. It is hardened by high frequency induction hardening to have a surface hardness of 58~64 HRC over the inner raceway surface 24a and a region from an inner-side base 6b of the wheel mounting flange 6 to the cylindrical portion 4b. The caulked portion 7 is not hardened and kept to the hardness after forging. This enables a sufficient mechanical strength to be applied against the rotary bending load applied to the wheel mounting flange 6. This improves the fretting strength of the cylindrical portion 4b forming the fitting portion to the inner ring 5. Thus, it achieves smooth plastic deformation working of the caulking portion 7 without causing micro cracks.

Outer member 23 is formed, on its outer circumference, with a body mount flange 23c adapted to be mounted on a knuckle (not shown). The outer member inner circumference includes an outer-side outer raceway surface 23a that opposes the inner raceway surface 24a of the wheel hub 24. Also, it includes an inner-side outer raceway surface 23b that opposes the inner raceway surface of the inner ring 5. Double row rolling elements 3a, 3b are contained between the outer and inner raceway surfaces. The balls 3a, 3b are rollably held by cages 26, 8. A seal 9 is mounted on the outer-side opening formed between the outer member 23 and the inner member 46. A protecting cover 27, as described below, is mounted on the inner-side opening. The seal 9 and cover 27 prevent leakage of lubricating grease sealed within the bearing and the entry of rain water or dust from the outside into the bearing.

Outer member 23 is formed of medium-high carbon steel such as S53C including carbon of 0.40~0.80% by weight. It is formed, on its inner circumference, with double row outer raceway surfaces 23a, 23a that are hardened by high frequency induction hardening to have a surface hardness of 58~64 HRC. Although shown with a double row angular contact ball bearing using balls as rolling elements 3a, 3b, the present disclosure is not limited to such a bearing. A double row tapered roller bearing using tapered rollers as rolling elements may be used. In addition, although shown as a bearing of the third generation type, the present disclosure can be applied to a second generation type or a fourth generation type.

In this embodiment, the pitch circle diameter PCDo of the outer-side row of rolling elements 3a is set larger than the pitch circle diameter PCDi of the inner-side rolling elements 3b (PCDo>PCDi). The diameter (do) of each rolling element 3a of the outer-side row is set smaller than the diameter (di) of each rolling element 3b of the inner-side row (do<di). The number Zo of the outer-side row of rolling element 3a is set larger than the number Zi of the inner-side row of rolling element 3b (Zo>Zi). This makes it possible to increase the bearing rigidity of the outer-side as compared with that of the inner-side. Thus, this extends the life of the bearing. Although shown as a wheel bearing where the size of each rolling element is different in the outer-side row and the inner side row, it will be understood that the same size of rolling elements can be used in both rows.

According to this embodiment, an annular supporting member 13 is press-fit onto the outer circumference of the inner ring 5. As clearly shown in the enlarged view in FIG. 9, the annular supporting member 13 is formed with an annular configuration with an L-shaped cross-section. It includes a cylindrical portion 13a and a standing portion 13b that extends radially outward from the cylindrical portion 13a. A magnetic encoder 14 is integrally adhered to the side of the annular supporting member 13 by vulcanizing adhesion.

As shown in FIG. 7, a protecting cover 27 is mounted on the outer member 23 to close the inner-side opening of the outer member 23. The protecting cover 27 is formed from non-magnetic austenitic stainless steel sheet (JIS SUS 304 etc.) by press working. It has a dish or cup-shaped configuration to prevent adverse influence to the detecting performance of the rotational speed sensor 22. The protecting cover 27 includes a cylindrical fitting portion 27a adapted to be press-fit into the inner-side end inner circumference of the outer member 23. An elastic member 28, formed from synthetic rubber, is on its outer circumference. A shielding portion (donut portion) 27c extends from the fitting portion 27a, via a radially reducing portion, and opposes the magnetic encoder 14 via a small axial gap. A bottom portion 27e extends from the shielding portion 27c via a bent portion 27d to cover the inner-side end of the inner member 46.

As shown in FIG. 9, the elastic member (sealing member) 28 of synthetic rubber, such as NBR, is integrally adhered to the radially reducing portion 27b of the protecting cover 27, by vulcanizing adhesion. The elastic member 28 has an annular projection 28a projecting radially outward from the fitting portion 27a. The elastic member 28 is adhered to the protecting cover 27 so that the annular projection 28a projects toward the inner-side from the side of the shielding portion 27c without interfering with the rotational speed sensor 22. The fitting surface of the end inner circumference of the outer member 23 is formed so that the amplitude of chatter vibration is limited to 3 μm or less. The annular projection 28a is elastically deformed and in press-contact with the end inner circumference of the outer member 23 when the projection 28a is press-fit to improve the sealability of the fitting portion 27a.

In this embodiment, a sensor cap 29 is further mounted on the inner-side of the protecting cover 27. This sensor cap 29 is press-formed from austenitic stainless steel sheet (JIS SUS 304 etc.) having corrosion resistance and cold rolled steel sheet (JIS SPCC etc.) preserved by cation electro deposition or galvanization by press working to have a cup (or dish) configuration. The cap 29 includes a cylindrical fitting portion 29a press-fit onto the inner-side end outer circumference of the outer member 23. A bottom portion 29b extends radially inward from the fitting portion 29a. The bottom portion 29b is in close contact with the inner-side end face of the outer member 23. The bottom portion 29b of the sensor cap 29 is formed with a fitting bore 30 at a horizontal position corresponding to the magnetic encoder 14. The rotational speed sensor 22 is inserted into the fitting bore 30 (FIG. 9). This makes it possible to suppress change in the air gap between the rotational speed sensor 22 and the magnetic encoder 14 even if the outer member 23 and the inner member 46 are inclined toward each other due to lateral loads applied by a wheel and thus obtains a stable detecting accuracy.

The rotational speed sensor 22 is inserted until it is positioned near to or in contact with the shielding portion (donut portion) 27c of the protecting cover 27 (FIG. 9). This obtains a desirable air gap and improves assembling workability without a complicated air gap adjustment. In addition, the protecting cover 27, with the elastic member 28 on the fitting portion, tightly seals the inside of bearing. Thus, this provides a wheel bearing apparatus incorporating a rotational speed detecting apparatus having improved sealability.

A securing nut 32 is press-fit into the through bore 31 formed at the center of the sensor cap 29 from the inside of the bearing (outer-side of the bottom portion 29b) (FIGS. 7 and 8). The rotational speed sensor 22 inserted into the fitting bore 30 of the sensor cap 29 is secured by fastening a mounting bolt into the securing nut 32, via a mounting member (not shown). Since the securing nut 32 is pulled to the inner-side surface of the bottom portion 29b by fastening the mounting bolt, dropping-off of the sensor cap 29 can be prevented only by press-fitting the securing nut 32. In this case, if the securing nut 32 is formed with an anti-rotation means, such as an axial groove, it will be advantageous against nut slip during fastening of the mounting bolt.

According to this embodiment, a drain 33 is formed on the corner between the fitting portion 29a and the bottom portion 29b of the sensor cap 29 (FIGS. 8 and 10). As shown in FIG. 8, the drain 33 is formed on the corner between the fitting portion 29a and the bottom portion 29b at a side near the road surface. This makes it possible to effectively exhaust foreign matter such as rain water, etc. from the drain 33 formed on the bottom corner of the sensor cap 29. Although it is shown that the drain 33 has a substantially rectangular configuration, it will be easily understood that any other configuration such as a circle or oval may be adopted.

A modification of FIG. 9 is shown in FIG. 11. Since this embodiment is basically only different from the embodiments described above in the structure of the protecting cover, the same reference numerals, as those used in the previous embodiments, are used to designate the same structural element. Accordingly, its detailed description will be omitted.

A protecting cover 34 is mounted on the outer member 23 to close the inner-side end. To avoid adverse influence to the detecting performance of the rotational speed sensor 22, the protecting cover 34 is formed from a non-magnetic austenitic stainless steel sheet (JIS SUS 304 etc.) by press working to have a dish (or cup)-shaped configuration. The protecting cover 34 includes a cylindrical fitting portion 34a press-fit into the end inner circumference of the outer member 23. It is provided with the elastic member 28 of synthetic rubber. A donut-shaped portion, or shielding portion 34c, extends radially inward from the fitting portion 34a, via a radially reducing portion 34b, and opposes the magnetic encoder 14, via a small axial gap. In the protecting cover 34 of this embodiment, the thickness H2 of a region from the fitting portion 34a to the shielding portion 34c, via a radially reducing portion 34b, is smaller than the thickness H1 of the other portion. More particularly, the thickness H2 of at least the shielding portion 34c is 0.2~1.0 mm. The thickness H1 is 1.0~1.5 mm. This enables setting the air gap small. Thus, this improves the detecting accuracy. In this case, accurate formation of the configuration of the shielding portion 34c would be difficult if the thickness H2 is less than 0.2 mm. On the other hand, the air gap would be increased. Thus, a desirable magnetic property could not be obtained and therefore the detecting accuracy would be detracted if the thickness H2 exceeds 1.0 mm.

Figure 12:
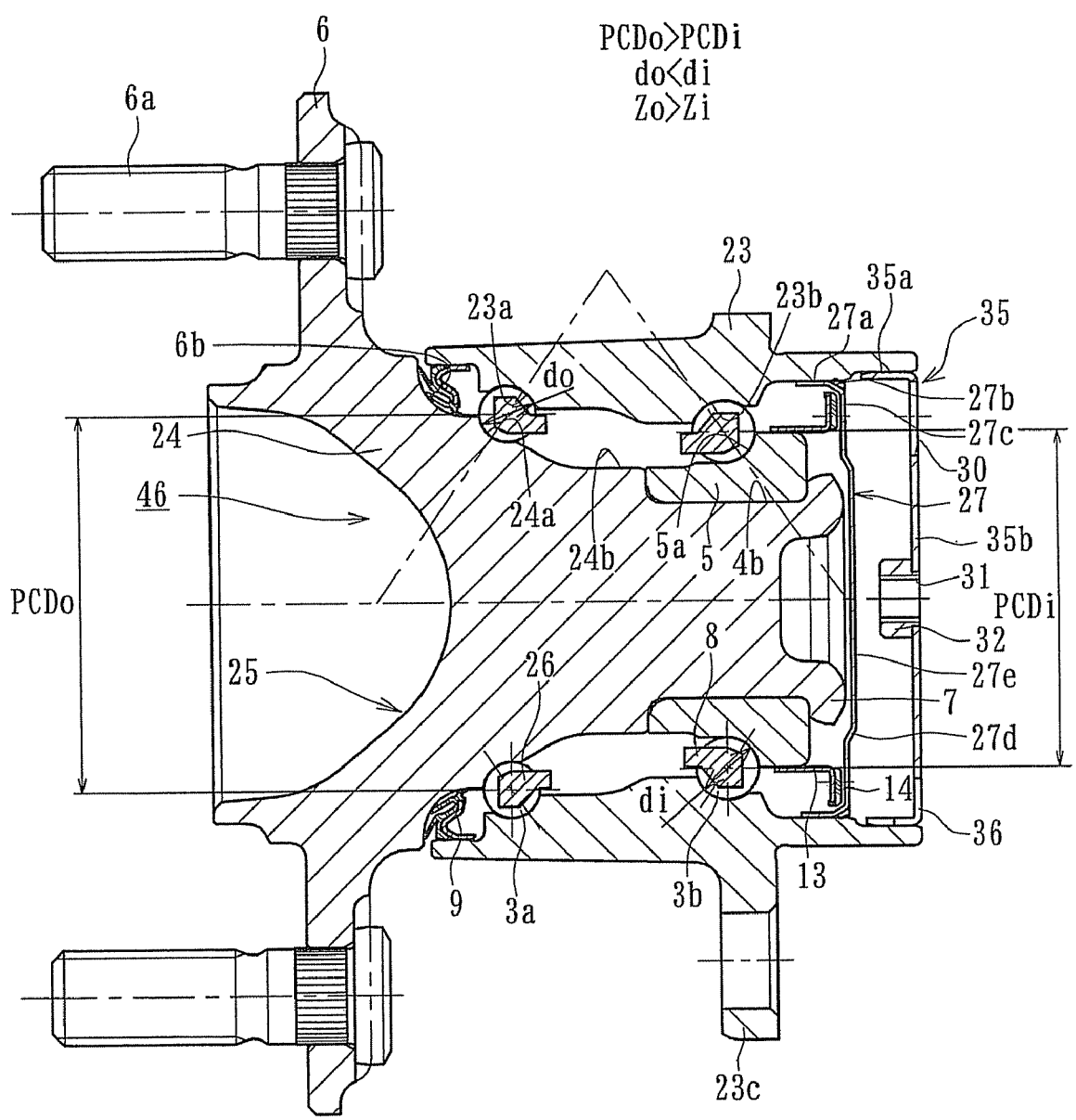
FIG. 12 is a longitudinal-section view of a third embodiment of a wheel bearing apparatus incorporating a rotational speed detecting apparatus.
Figure 13:
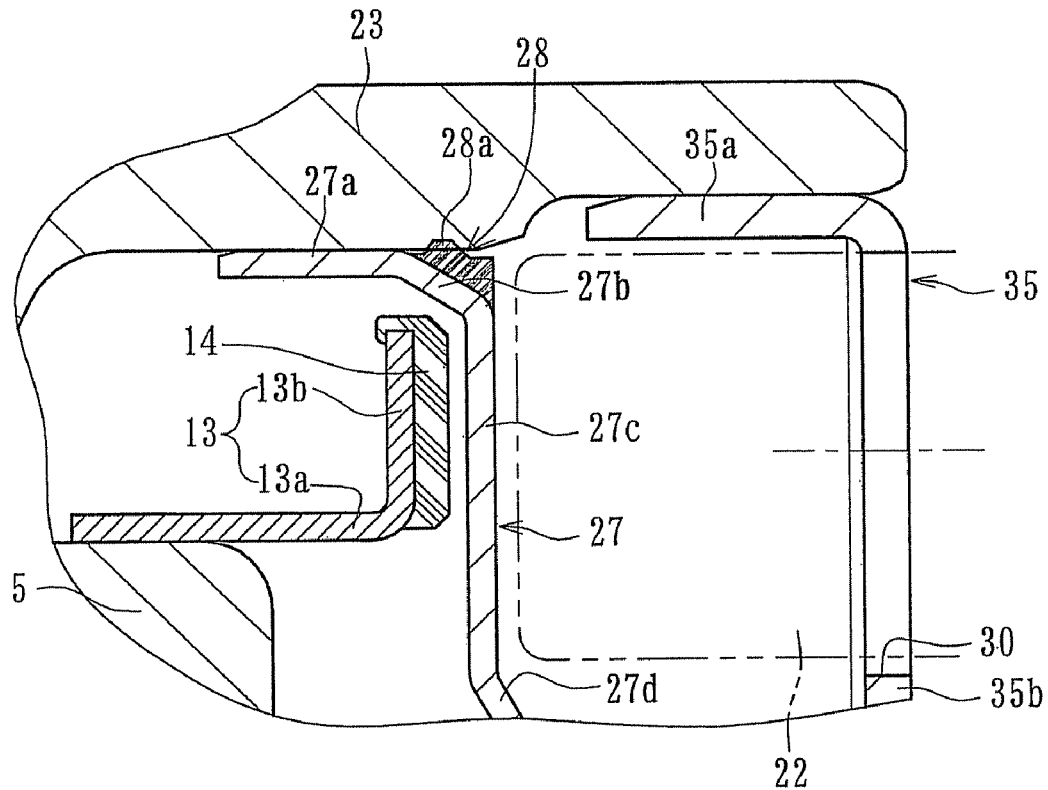
FIG. 13 is a partially enlarged view of the detecting portion of FIG. 12.
Figure 14:
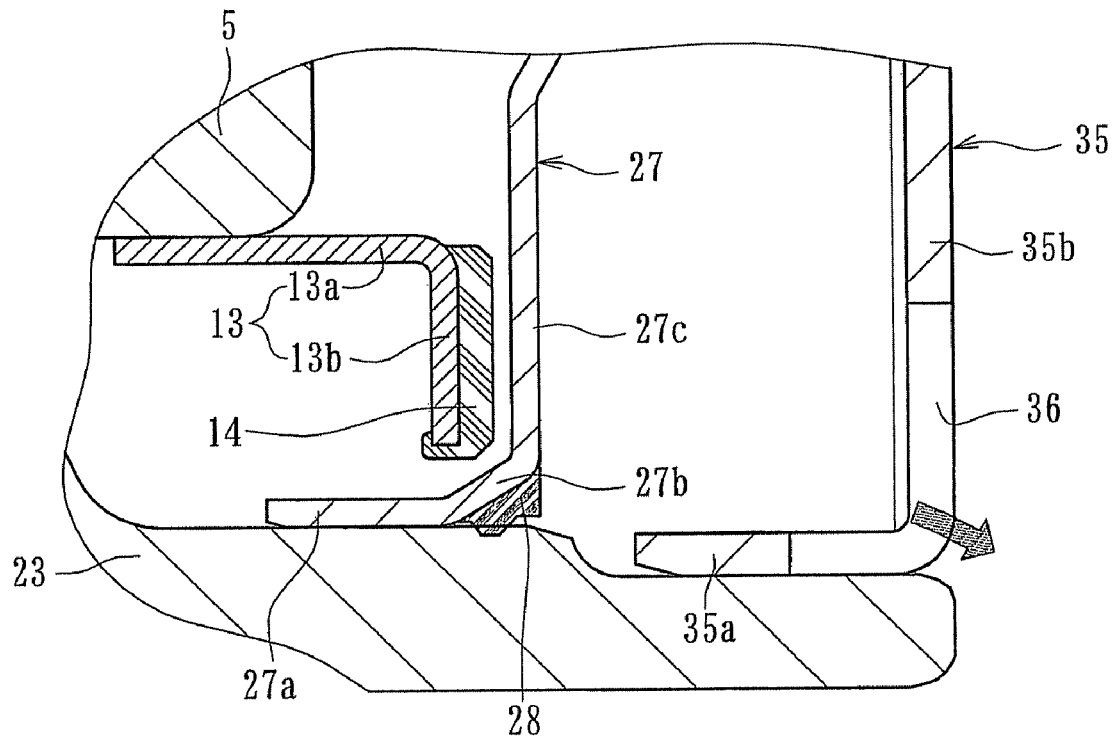
FIG. 14 is a partially enlarged view of the drain portion of FIG. 12.

FIG. 12 is a longitudinal-section view of a third embodiment of a wheel bearing apparatus incorporating a rotational speed detecting apparatus. FIG. 13 is a partially enlarged view of the detecting portion of FIG. 12. FIG. 14 is a partially enlarged view of the drain portion of FIG. 12. Since this embodiment is basically only different from the second embodiment (FIG. 7) in the structure of the sensor cap protecting cover, the same reference numerals as those used in the previous embodiments are used to designate the same structural element and its detailed description will be omitted.

A sensor cap 35 is press-fit into the end inner circumference of the outer member 23 to close the inner-side opening of the outer member 23. The sensor cap 35 is press-formed from austenitic stainless steel sheet (JIS SUS 304 etc.) having corrosion resistance and cold rolled steel sheet (JIS SPCC etc.) preserved by cation electro deposition or galvanization by press working. The cap 35 has a cup (or dish) configuration. It includes a cylindrical fitting portion 35a press-fit into the inner-side end inner circumference of the outer member 23. A bottom portion 35b is in close contact with the inner-side end face of the outer member 23. A securing nut 32 is press-fit at the center or near the bottom portion 35b of the sensor cap 35. In this embodiment, since the sensor cap 35 is press-fit into the end inner circumference and not onto the outer circumference, as in the second embodiment, it is possible to further increase the rigidity of the sensor cap 35 itself as compared with the outer circumference fitting type (second embodiment). Thus, this suppresses the sensor cap 35 from being deformed or damaged by impingement of pebbles, etc. during running of the vehicle.

As shown in the enlarged view of FIG. 13, a fitting bore 30 is formed in the bottom portion 35b of the sensor cap 35 at a position corresponding to the magnetic encoder 14. The rotational speed sensor 22 is inserted into the fitting bore 30. Also, as shown in the enlarged view of FIG. 14, a drain 36 is formed on the corner between the fitting portion 35a and the bottom portion 35b of the sensor cap 35. Since the drain 36 is formed at a side near the road surface, it is possible to effectively exhaust foreign matter such as rain water, etc. from the drain 36.

Figure 15:
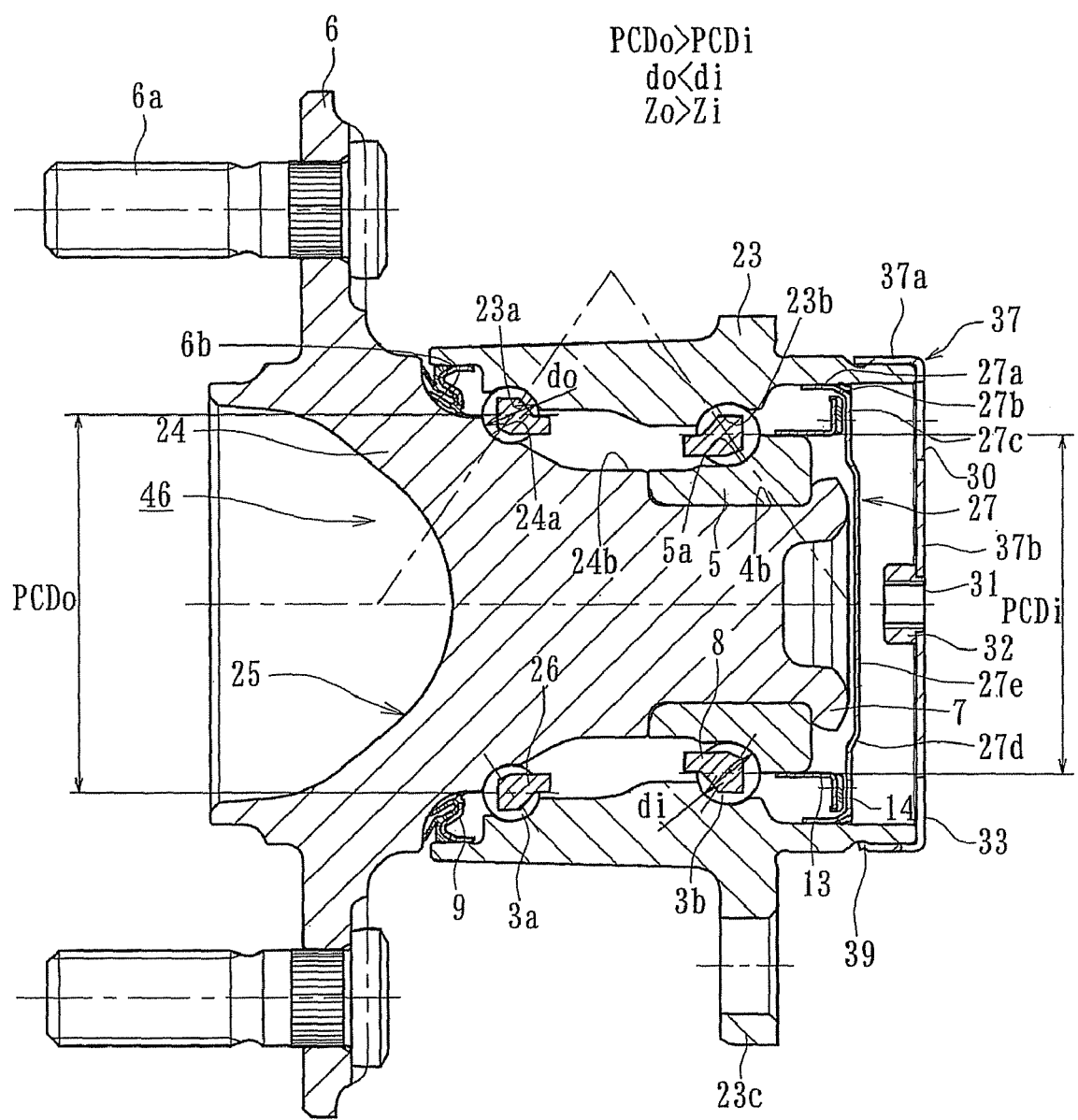
FIG. 15 is a longitudinal-section view of a fourth embodiment of a wheel bearing apparatus incorporating a rotational speed detecting apparatus.
Figure 16:
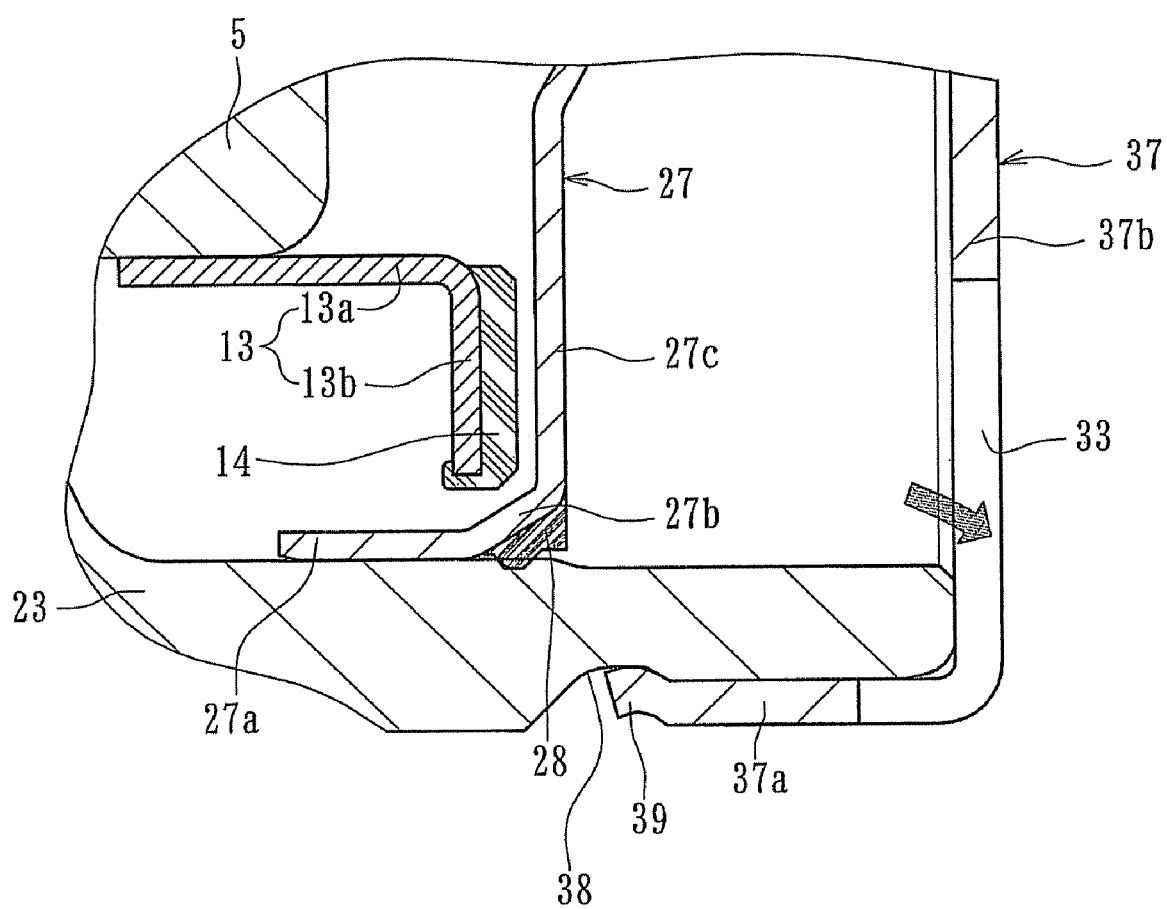
FIG. 16 is a partially enlarged view of the drain portion of FIG. 15.

FIG. 15 is a longitudinal-section view of a fourth embodiment of a wheel bearing apparatus incorporating with a rotational speed detecting apparatus. FIG. 16 is a partially enlarged view of the drain portion of FIG. 15. Since this embodiment is basically only different from the second embodiment (FIG. 7) in the structure of the sensor cap, the same reference numerals as those used in the previous embodiments are used to designate the same structural element and its detailed description will be omitted.

A sensor cap 37 is press-fit into the end outer circumference of the outer member 23 to close the inner-side opening of the outer member 23. The sensor cap 37 is press-formed from austenitic stainless steel sheet (JIS SUS 304 etc.) having corrosion resistance and cold rolled steel sheet (JIS SPCC etc.) preserved by cation electro deposition or galvanization by press working to have a cup (or dish) configuration. The cap includes a cylindrical fitting portion 37a press-fit into the inner-side end outer circumference of the outer member 23. A bottom portion 37b is in close contact with the inner-side end face of the outer member 23. A securing nut 32 is press-fit at the center or near the bottom portion 37b of the sensor cap 37.

As shown in the enlarged view of FIG. 16, a drain 33 is formed on the corner between the fitting portion 37a and the bottom portion 37b of the sensor cap 37. According to this embodiment, the fitting portion 37a of the sensor cap 37 is press-fit onto the end outer circumference of the outer member 23. The end of the fitting portion 37a of the sensor cap 37 is caulked in an annular groove 38. The annular groove 38 is formed on the end outer circumference of the outer member 23. This makes it possible to prevent axial slip-off of the sensor cap 37 due to repeated deformation of the fitting portion 37a. Thus, this maintains the original air gap for a long term. In addition, the formation of the caulking of the sensor cap 37 increases its gripping force against slip-off. Thus, this reduces the thickness of the end of the outer member 23. This contributes to a reduction of the weight of the wheel bearing apparatus.

Figure 17:
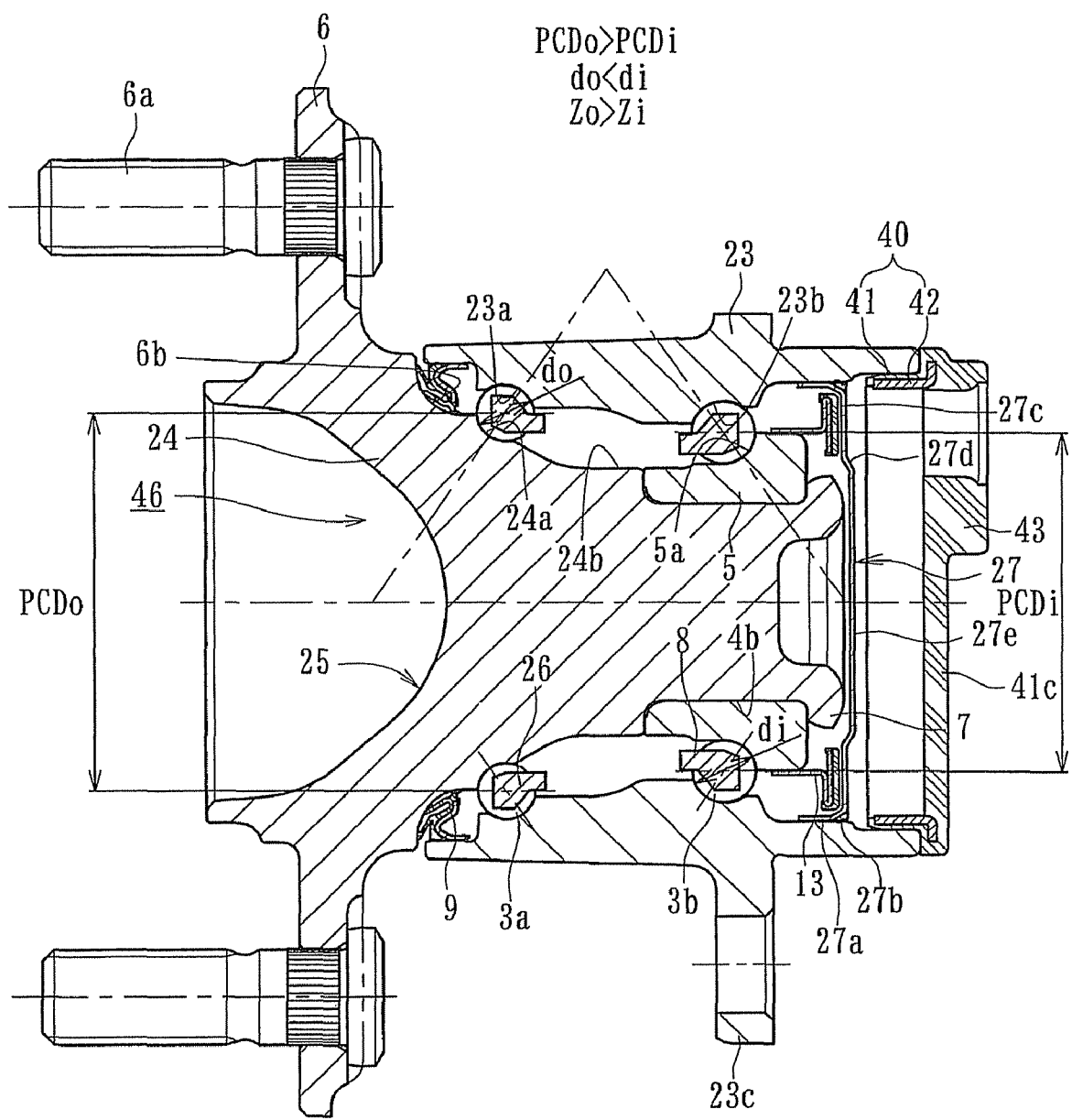
FIG. 17 is a longitudinal-section view taken along a line XVII-XVII of a fifth embodiment of a wheel bearing apparatus incorporating a rotational speed detecting apparatus.
Figure 18:
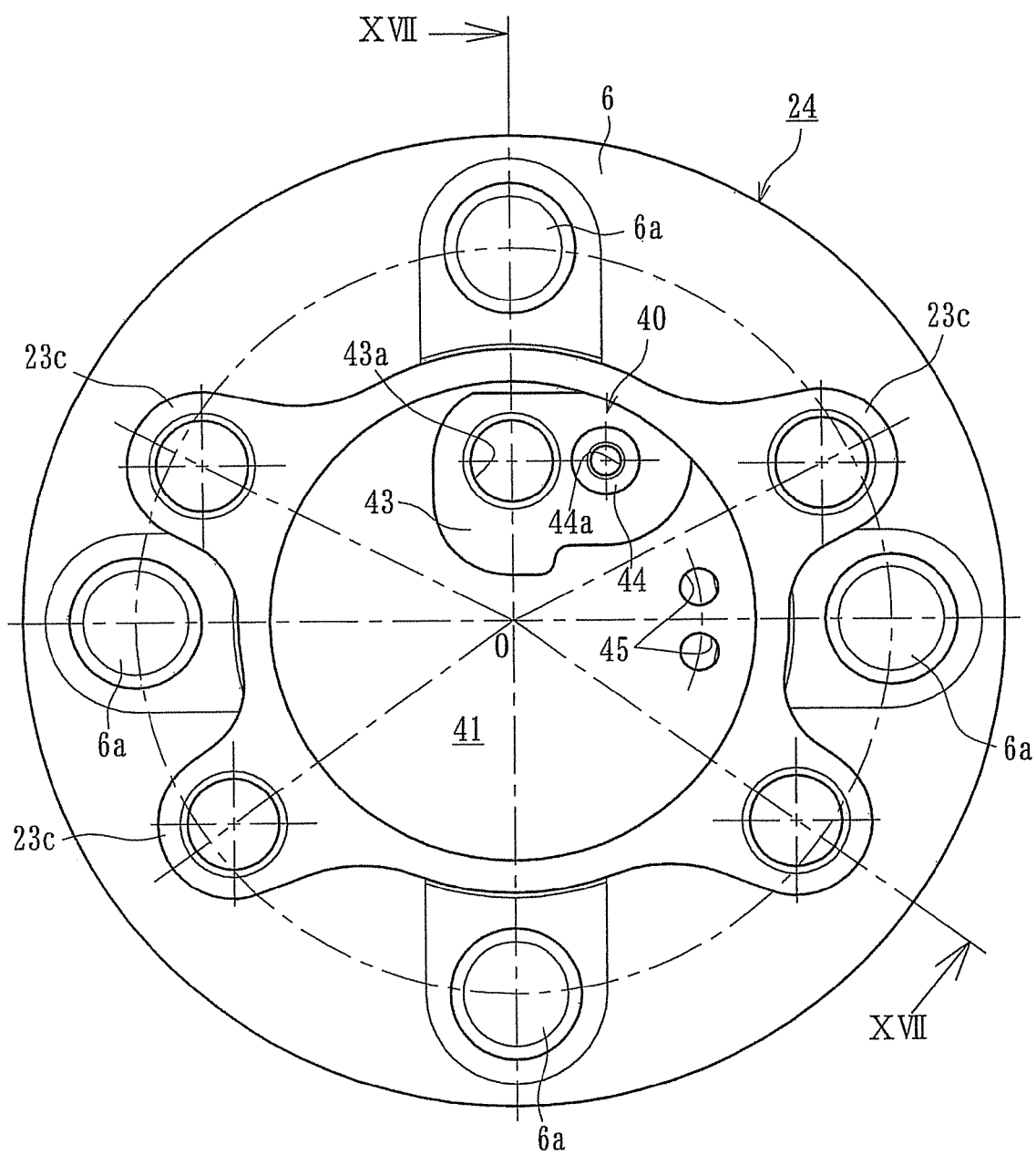
FIG. 18 is a side elevation view of FIG. 17.
Figure 19:
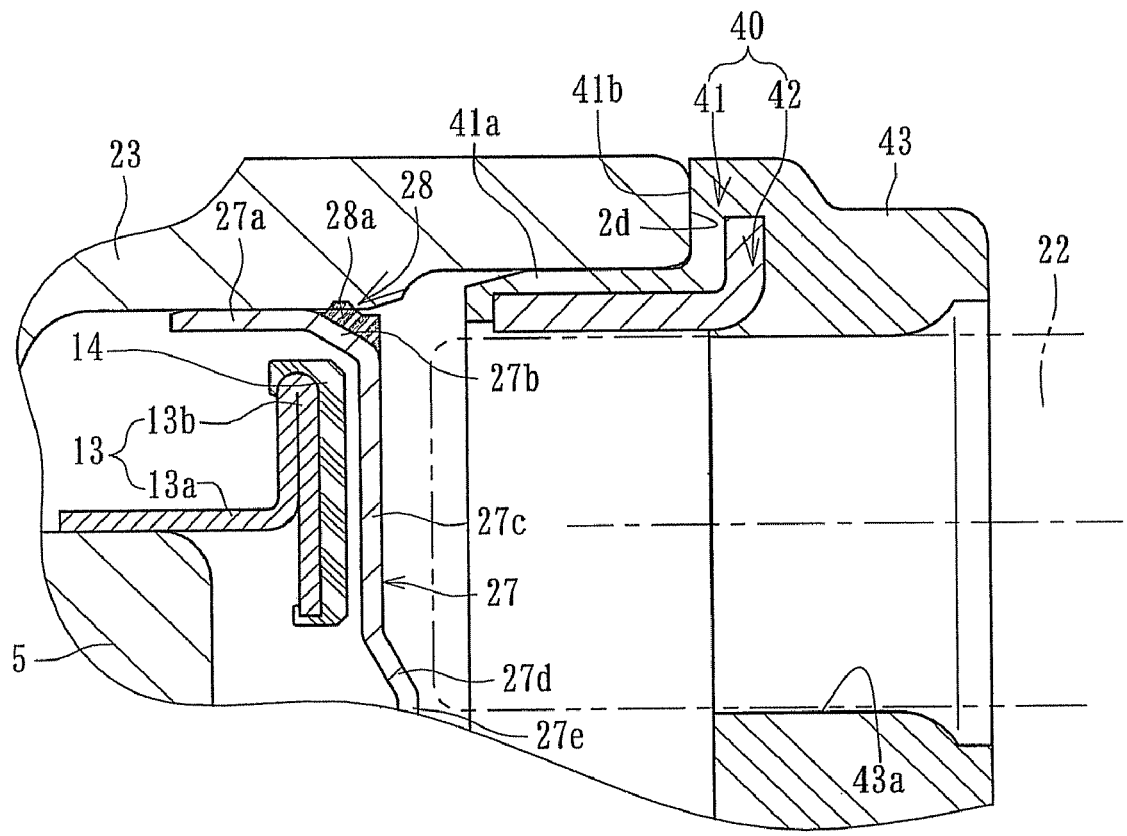
FIG. 19 is a partially enlarged view of the detecting portion of FIG. 17.
Figure 20:
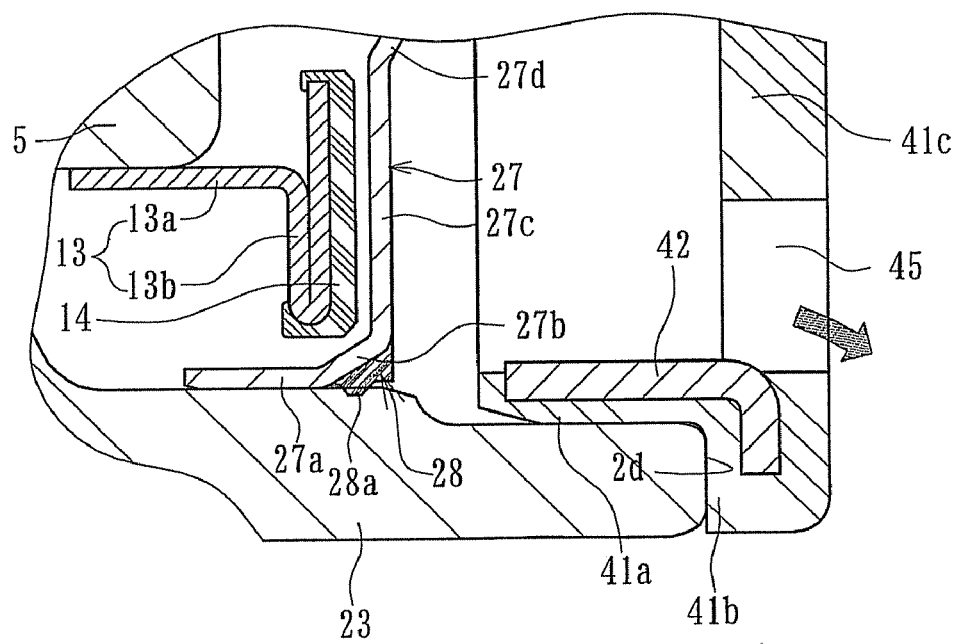
FIG. 20 is a partially enlarged view of the drain portion of FIG. 17.
Figure 21:
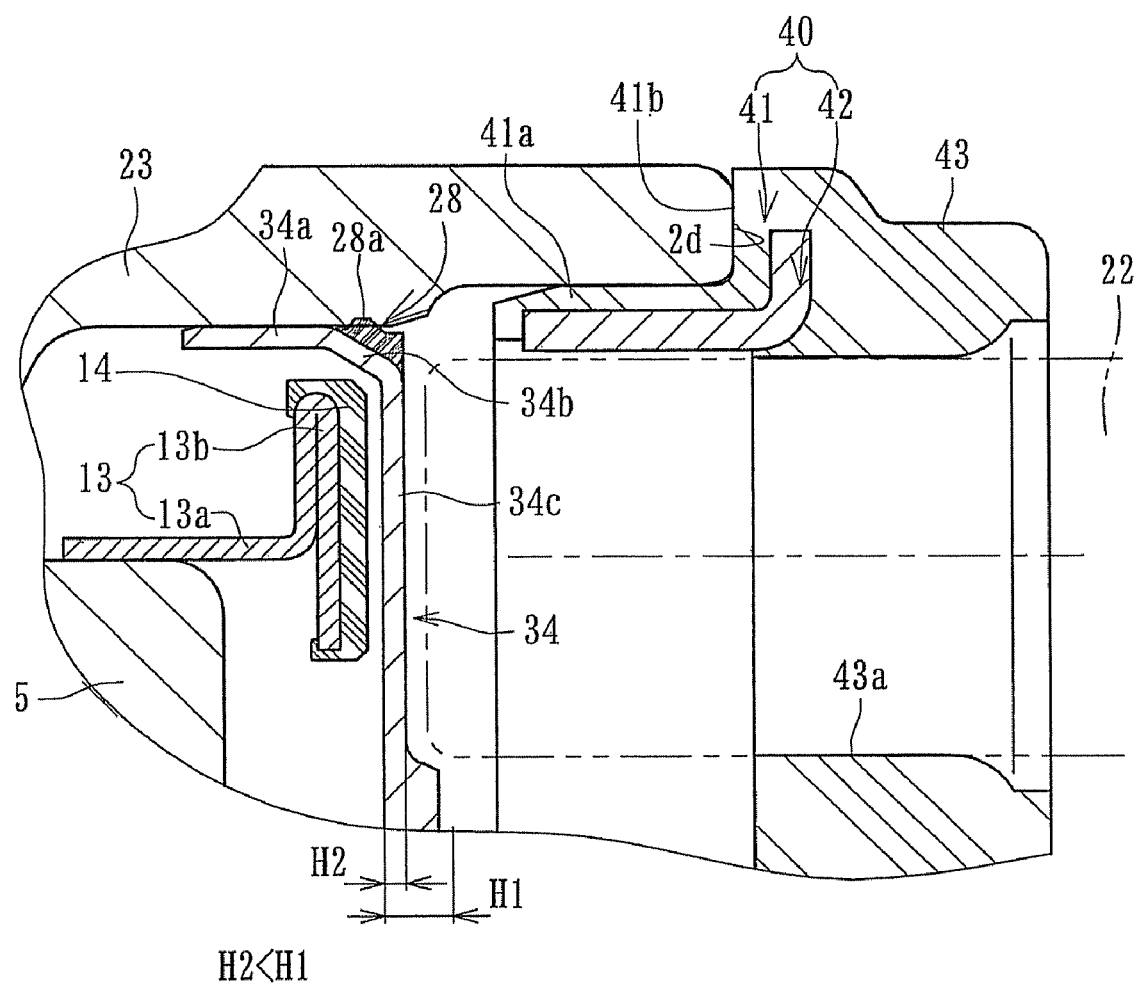
FIG. 21 is a partially enlarged view of a modification of FIG. 19.
Figure 22:
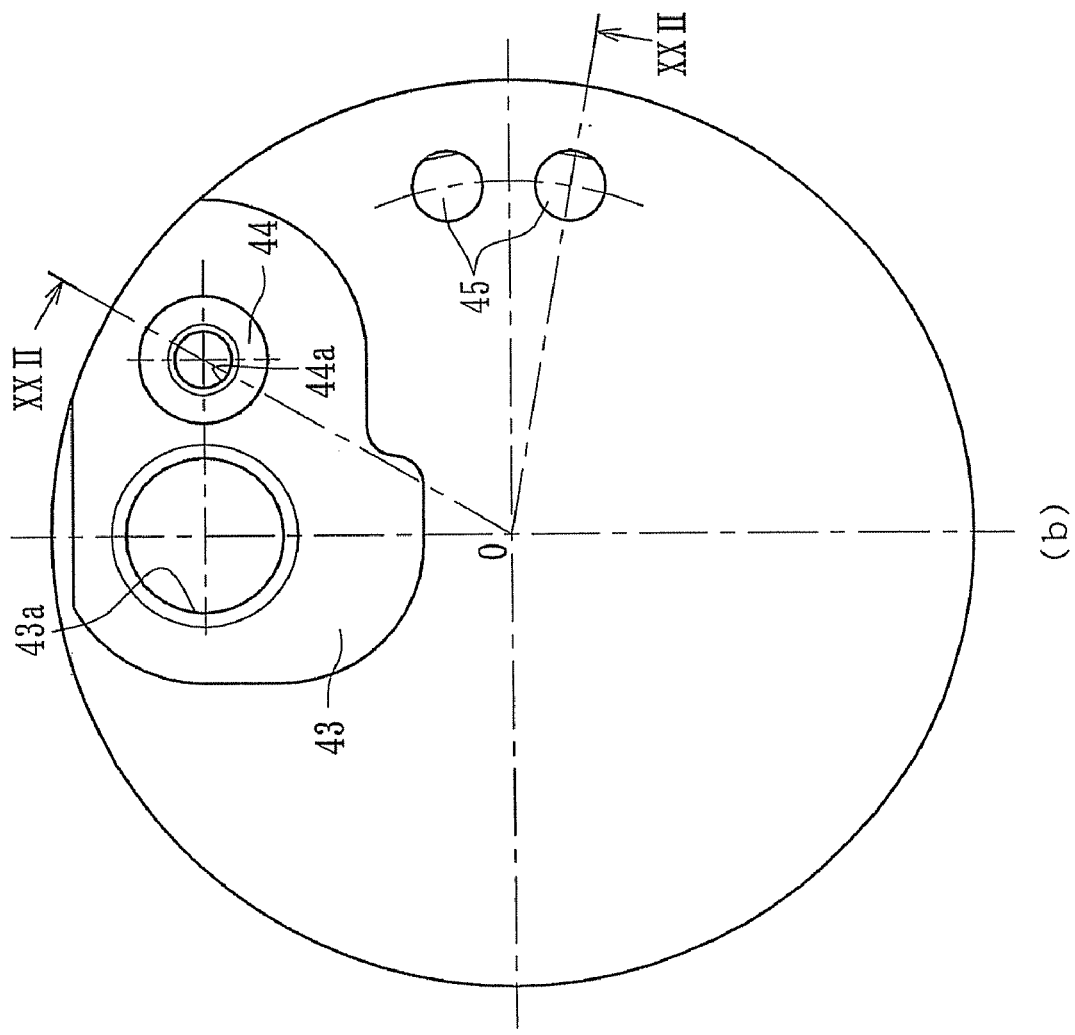
FIG. 22(a) is a longitudinal-section view taken along a line XXII-XXII of FIG. 22(b) showing a sensor protecting cover.
FIG. 22(b) is a side elevation view of FIG. 22(a).
Figure 22:
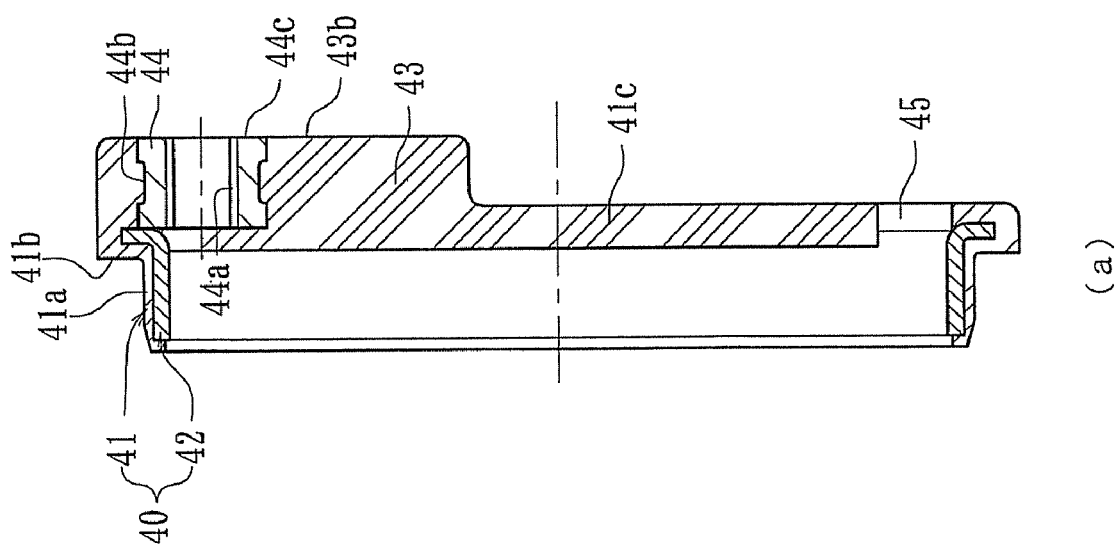
Figure 23:
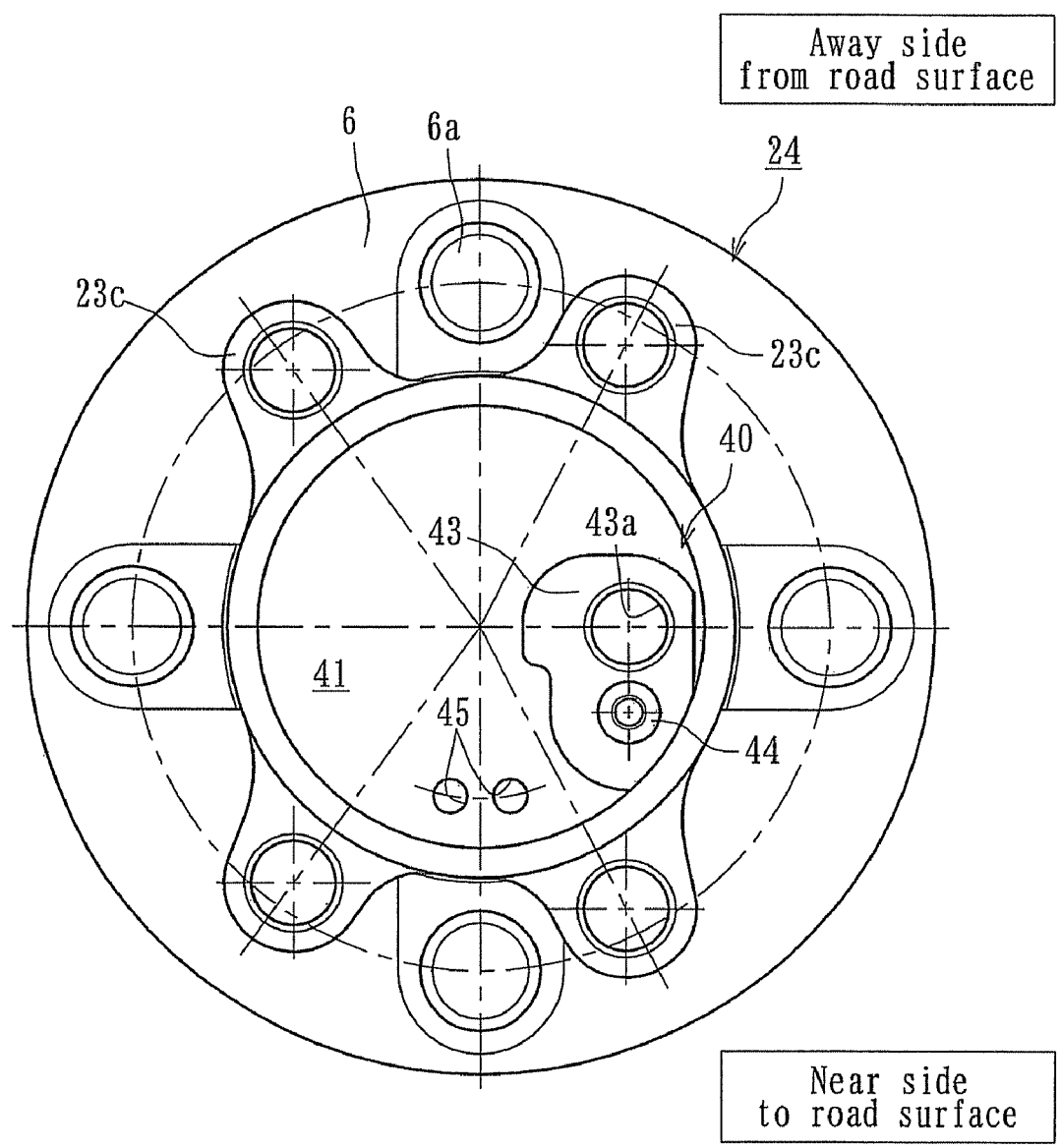
FIG. 23 is a side elevation view of FIG. 17 showing a condition mounted on a vehicle.
Figure 24:
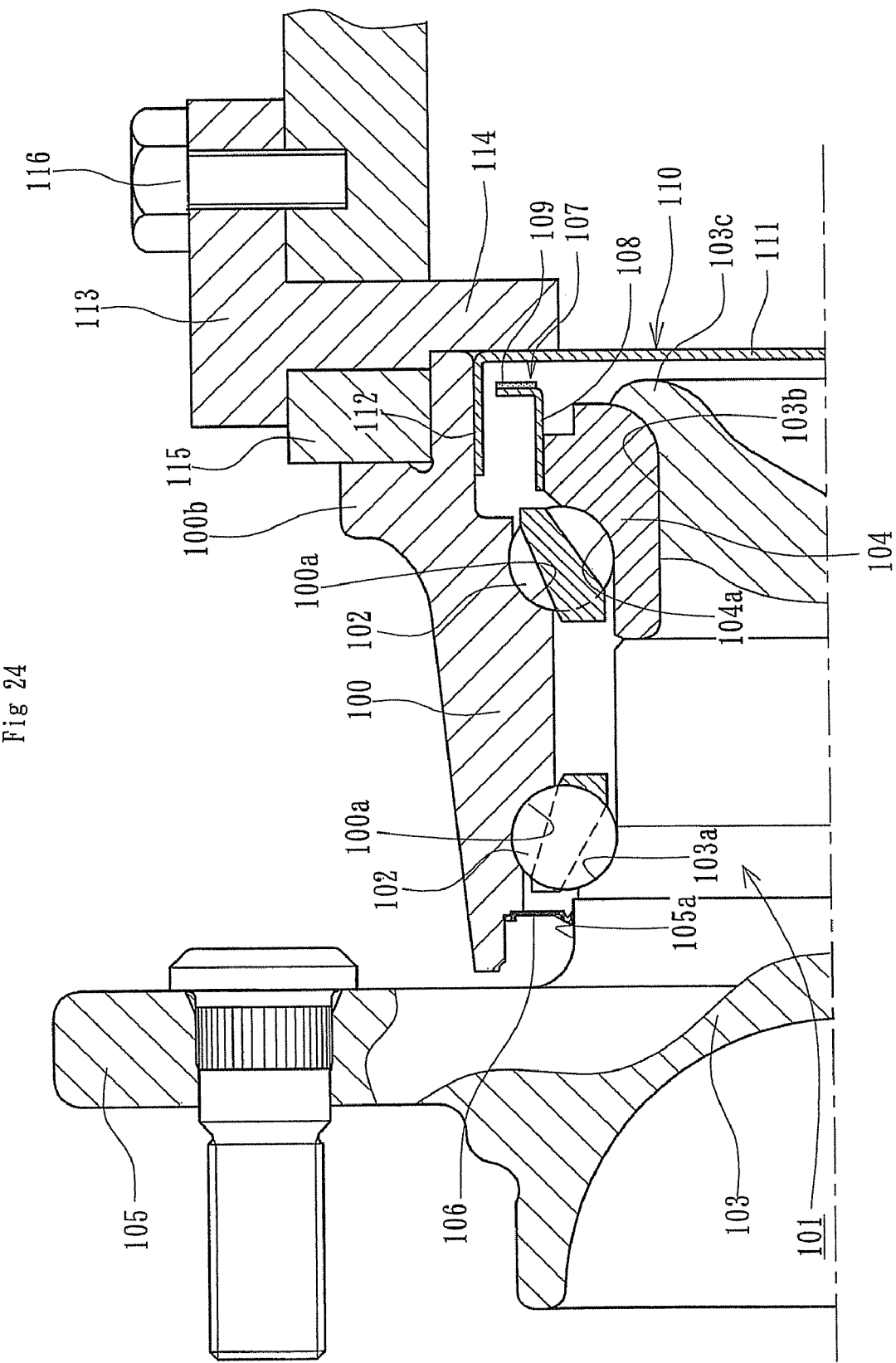
FIG. 24 is a longitudinal-section view of a prior art wheel bearing apparatus incorporating a rotational speed detecting apparatus.
Figure 25:
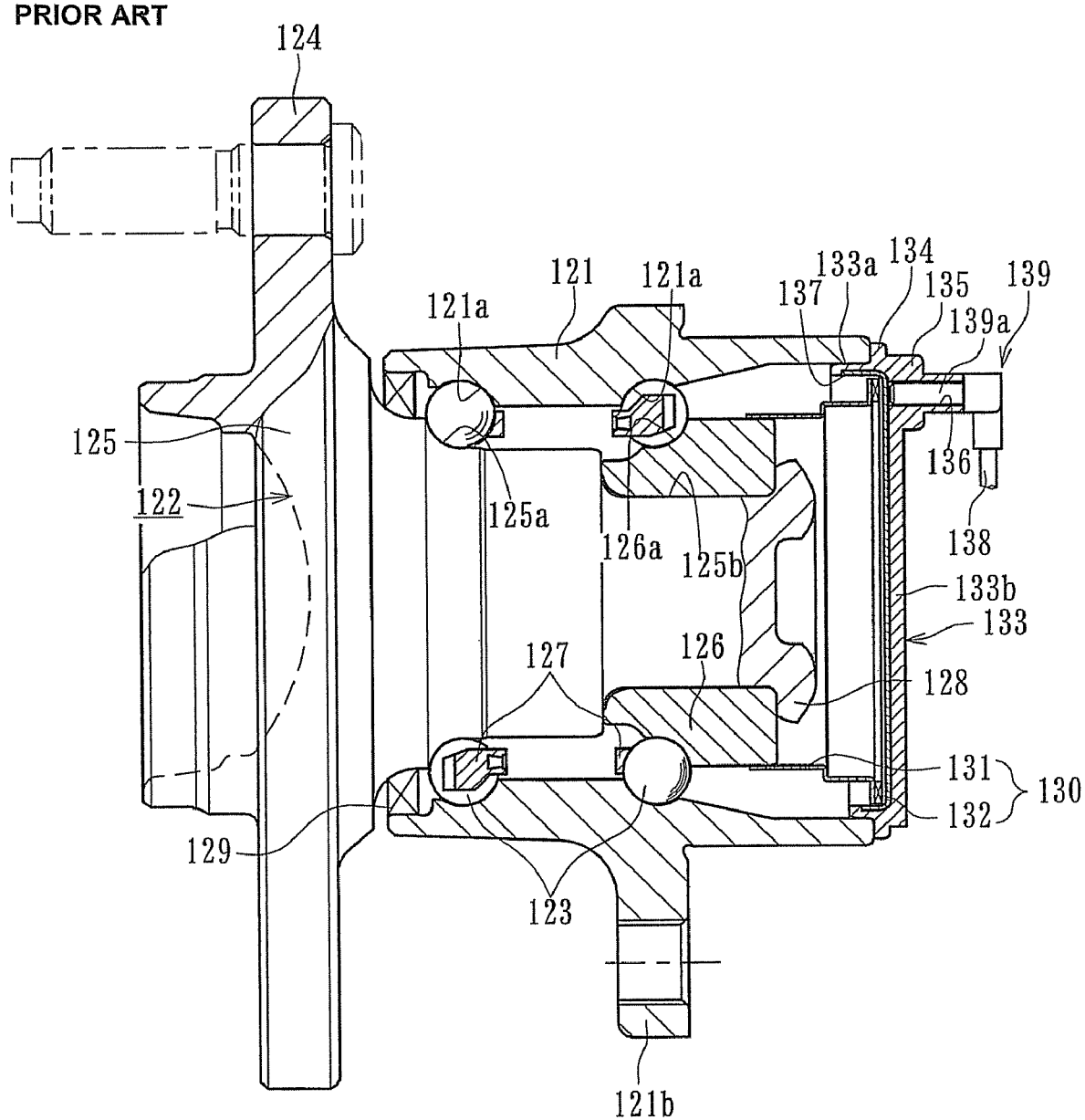
FIG. 25 is a longitudinal-section view of another prior art wheel bearing apparatus incorporating a rotational speed detecting apparatus.
Figure 26:
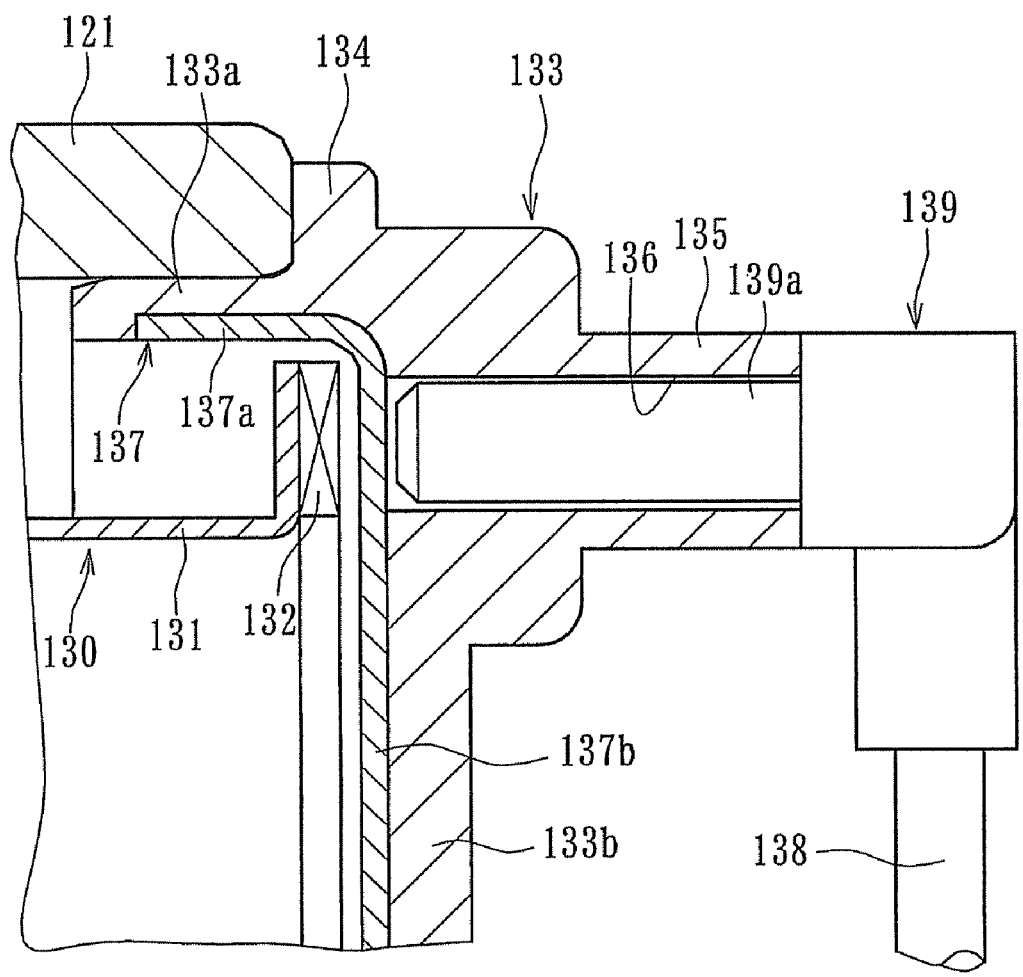
FIG. 26 is a partially enlarged view of FIG. 25.

FIG. 17 is a longitudinal-section view taken along a line XVII-XVII showing a fifth embodiment of a wheel bearing apparatus incorporating a rotational speed detecting apparatus. FIG. 18 is a side elevation view of FIG. 17. FIG. 19 is a partially enlarged view of the detecting portion of FIG. 17. FIG. 20 is a partially enlarged view of the drain portion of FIG. 17. FIG. 21 is a partially enlarged view of a modification of FIG. 19. FIG. 22(a) is a longitudinal-section view taken along a line XXII-XXII of FIG. 22(b) of a sensor protecting cover. FIG. 22(b) is a side elevation view of FIG. 22(a). FIG. 23 is a side elevation view of FIG. 17 of a condition mounted on a vehicle. Since this embodiment is basically only different from the fourth embodiment (FIG. 15) in the structure of the sensor cap, the same reference numerals as those used in the previous embodiments are used to designate the same structural element and its detailed description will be omitted.

This wheel bearing apparatus incorporating a rotational speed detecting apparatus is a so-called "third generation" type for a driven wheel. It includes an inner member 46, an outer member 23, and double row rolling elements (balls) 3a, 3b contained between the inner and outer members 46 and 23. The inner member 46 includes the wheel hub 24 and an inner ring 5 press-fit onto the wheel hub 24 via a predetermined interference.

A protecting cover 27 is mounted on the outer member 23 to close the inner-side opening of the outer member 23. As shown in FIG. 19, an elastic member 28 of synthetic rubber, such as NBR, is integrally adhered to the radially reducing portion 27b of the protecting cover 27 by vulcanizing adhesion. The elastic member 28 has an annular projection 28a projecting radially outward from the fitting portion 27a. It is adhered to the protecting cover 27 so that the annular projection 28a projects toward the inner-side from the side of the shielding portion 27c without interfering with the rotational speed sensor 22. The fitting surface of the end inner circumference of the outer member 23 is formed so that the amplitude of chatter vibration is limited to 3 μm or less. The annular projection 28a is elastically deformed and press-contacts with the end inner circumference of the outer member 23 when the projection 28a is press-fit to improve the sealability of the fitting portion 27a.

In this embodiment, a sensor cap 40 is further mounted on the inner-side of the protecting cover 27. This sensor cap 40 is secured in the inner-side end inner circumference of the outer member 23 to close the opening of the outer member 23. The sensor cap 40 includes a cylindrical cap body 41 with a bottom. The cap 40 is formed of synthetic resin by injection molding. A metal core 42 is integrally molded with the cap body 41 at the opening portion of the cap body 41. The metal core 42 is press-formed from stainless steel sheet or cold rolled steel sheet (JIS SPCC etc.), with corrosion resistance, to have a dish-shaped configuration. The metal core 42 is preferably formed of non-magnetic steel sheet, e.g. austenitic stainless steel sheet (JIS SUS 304 etc.), so that the metal core 42 does not give adverse influence to the detecting performance of the rotational speed sensor 22.

The cap body 41 is formed by injection molding thermoplastic synthetic resin such as PA (polyamide) 66 or PA 6-12 preferably to which 10~50% by weight of GF (glass fiber) reinforcing material is added. This improves the corrosion resistance, strength, rigidity and thus durability of the cap body 41 without giving any adverse influence to the detecting performance of the rotational speed sensor 22. Other injection moldable materials such as polyphenylene sulfide (PPS), PPA (polyphthalamide), PBT (polybutyleneterephthalate) etc. may be used to form the cap body 41. In addition, CF (carbon fiber), aramid fiber, boron fiber etc. other than GF may be used as the fiber reinforcing material.

In this embodiment, the cap body 41 comprises a cylindrical fitting portion 41a press-fit into the inner-side end inner circumference of the outer member 23. A bottom portion 41c extends radially inward from the fitting portion 41a, via a stepped portion 41b, that is in close contact with the inner-side end face 2d of the outer member 23 (FIGS. 19, 20 and 22). In addition, the amplitude of chatter vibration of the fitting surface of end inner circumference of the outer member 23 is limited to 3 μm or less. This improves the sealability of the fitting portion 41a of the cap body 41. The stepped portion 41b, in close contact with the end face 2d, improves the positioning accuracy of the sensor cap 40 to achieve easy air gap adjustment and improve the detecting accuracy.

As shown in FIGS. 17 and 18, a mounting portion 43 is integrally formed with the bottom portion 41c. The mounting portion 43 axially projects from the bottom portion at a radially outer position. A securing nut 44 is embedded in the mounting portion 43 by insert molding. As clearly understood from FIG. 22, the rotational speed sensor 22 can be secured to a fitting bore 43a of the mounting portion 43 by fastening a securing bolt into a female thread 44a of the securing nut 44, via a mounting flange (not shown). An annular groove 44b, formed around the outer circumference of the securing nut 44, can prevent an axial movement of the securing nut 44. The securing nut 44 is formed from steel material with corrosion resistance such as austenitic stainless steel sheet (JIS SUS 304 etc.), ferritic stainless steel sheet (JIS SUS 430 etc.) etc. This prevents the generation of corrosion for a long term. Thus, this improves the durability of the wheel bearing apparatus.

The inner-side end face 44c of the securing nut 44 is positioned so that it is flush with the end face 43b of the mounting portion 43 or it slightly projects from it. This makes it possible to improve the sealability due to intimate contact of the end faces of the securing bolt and securing nut 44 in fastening of them and to increase the fastening force.

In this embodiment, a pair of drains 45, 45 are formed in the bottom portion 41c of the cap body 41 (FIGS. 18, 20 and 22). As shown in FIG. 23, the drains 45 are formed at a position near the road-side. This makes it possible to effectively exhaust foreign matter such as rain water, etc. from the drains 45 formed on the bottom of the sensor cap 40. Although one pair of circular drains is shown, it will be easily understood that any other configuration such as one circular aperture or oval aperture may be adopted.

A modification of FIG. 19 is shown in FIG. 21. This embodiment is basically only different from embodiments described above in the structure of the protecting cover. The same reference numerals as those used in the previous embodiments are used to designate the same structural elements and their detailed description will be omitted.

A protecting cover 34 is mounted on the outer member 23 to close the inner-side end. The protecting cover 34 includes a cylindrical fitting portion 34a press-fit into the end inner circumference of the outer member 23. The cylindrical fitting portion 34a is provided with the elastic member 28 of synthetic rubber. A shielding portion 34c extends radially inward from the fitting portion 34am via a radially reducing portion 34b. The shielding portion opposes the magnetic encoder 14 via a small axial gap. In the protecting cover 34 of this embodiment, the thickness H2 of a region from the fitting portion 34a to the shielding portion 34c, via a radially reducing portion 34b, is smaller than the thickness H1 of other portion. More particularly, the thickness H2 of at least the shielding portion 34c is 0.2~1.0 mm. The thickness H1 is 1.0~1.5 mm. This enables the setting of a small air gap. Thus, this improves the detecting accuracy. In this case, accurate formation of the configuration of the shielding portion 34c would be difficult if the thickness H2 is less than 0.2 mm. On the other hand, the air gap would be increased and a desirable magnetic property could not be obtained. Therefore, the detecting accuracy would be detracted if the thickness H2 exceeds 1.0 mm.

As shown in FIG. 23, the rotational speed sensor 22 is arranged so that it takes a horizontal position relative to the road surface under a condition mounted to a wheel. Accordingly, it is possible to suppress variation of the air gap between the rotational speed sensor 22 and the magnetic encoder 14. Thus, this obtains a stable detecting accuracy even if the outer member 23 and the inner member 46 are inclined relatively to each other by a lateral load from wheels.

The present disclosure can be applied to any type of wheel bearing apparatus incorporating a rotational speed detecting apparatus for a driving wheel, a driven wheel and types using balls or tapered rollers the as rolling elements.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a rotational speed detecting apparatus comprising:
    an outer member integrally formed with double row outer raceway surfaces on its inner circumference;
    an inner member including a wheel hub and at least one inner ring, the wheel hub is integrally formed at one end with a wheel mounting flange, a cylindrical portion axially extends from the wheel mounting flange, the inner ring is press fit onto the cylindrical portion of the wheel hub, the wheel hub and the inner ring are formed with double row inner raceway surfaces on their outer circumferences, the inner raceway surfaces oppose the double row outer raceway surfaces;
    double row rolling elements are rollably contained between the inner raceway surfaces and outer raceway surfaces of the inner member and outer member;
    a magnetic encoder is adapted to be fit onto the outer circumference of the inner ring and secured to the inner ring, the magnetic encoder has a magnetic characteristics alternately and equidistantly varying in a circumferential direction;
    a seal is mounted on an outer-side end of the outer member, a protecting cover is mounted on an inner-side of the outer member, the seal and protecting cover close and seal annular openings formed between the outer member and the inner member;
    the protecting cover is formed of non-magnetic steel sheet to have a cup-shaped configuration by press working, the protective cover includes a cylindrical fitting portion press-fit into an end, inner circumference of the outer member, a donut-shaped shielding portion extends radially inward from the fitting portion via a radially reducing portion, an inner-side surface of the shielding portion is arranged near to or in contact with a rotational speed detecting sensor, a bottom portion is continuous with the shielding portion via a stepped portion to close the inner-side end of the inner member;
    a sealing member is integrally adhered to the outer circumference of the radially reducing portion by vulcanizing adhesion, the sealing member includes an annular portion and a projected portion, the annular portion of the sealing member is positioned axially inside of the projected portion, the annular portion is formed with a diameter slightly smaller than the outer diameter of the fitting portion of the protecting cover, the projected portion is formed with a diameter slightly larger than the outer diameter of the fitting portion of the protecting cover; and
    the projected portion is press-fit into the end inner circumference of the outer member via a predetermined interference.

2. The wheel bearing apparatus incorporating with a rotational speed detecting apparatus of claim 1, wherein the radially reducing portion has a stepped cross-sectional configuration.

3. The wheel bearing apparatus incorporating a rotational speed detecting apparatus of claim 1, wherein the radially reducing portion has a tapered cross-sectional configuration.

4. The wheel bearing apparatus incorporating a rotational speed detecting apparatus of claim 1, wherein the dimension of the sealing member is determined so that the sealing member does not project further toward the inner-side beyond the outer-side surface of the shielding portion under a free condition where the protecting cover has not yet been fitted into the outer member.

5. The wheel bearing apparatus incorporating a rotational speed detecting apparatus of claim 1, wherein an inner-side end face of the outer member is formed so that it slightly projects further toward the inner-side than a larger end face of the inner ring.

6. The wheel bearing apparatus incorporating a rotational speed detecting apparatus of claim 5, wherein a detecting surface of the magnetic encoder is positioned along a same plane as that of the larger end face of the inner ring or at a position slightly projecting further toward the inner-side than the larger end face of the inner ring.

7. The wheel bearing apparatus incorporating a rotational speed detecting apparatus of claim 1, wherein a sheet thickness of the shielding portion of the protecting cover is thinner than the sheet thickness of other portions.

8. The wheel bearing apparatus incorporating a rotational speed detecting apparatus of claim 1 wherein the protecting cover is formed of non-magnetic austenitic stainless steel sheet.

9. The wheel bearing apparatus incorporating a rotational speed detecting apparatus of claim 1, wherein a pitch circle diameter of the outer-side row of rolling elements is set larger than a pitch circle diameter of the inner-side row of rolling elements, wherein a diameter of each rolling element of the outer-side row is set smaller than a diameter of each rolling element of the inner-side row, and a number of the outer-side row of rolling element is set larger than a number of the inner-side row of rolling element.

10. A wheel bearing apparatus incorporating a rotational speed detecting apparatus comprising:

an outer member integrally formed with double row outer raceway surfaces on its inner circumference;

an inner member including a wheel hub and at least one inner ring, the wheel hub is integrally formed at one end with a wheel mounting flange, a cylindrical portion axially extends from the wheel mounting flange, the inner ring is press fit onto the cylindrical portion of the wheel hub, the wheel hub and the inner ring are formed with double row inner raceway surfaces on their outer circumferences, the inner raceway surfaces oppose the double row outer raceway surfaces;

double row rolling elements are rollably contained between the inner raceway surfaces and outer raceway surfaces of the inner member and outer member;

a magnetic encoder is adapted to be fit onto the outer circumference of the inner ring and secured to the inner ring, the magnetic encoder has a magnetic characteristics alternately and equidistantly varying in a circumferential direction;

a seal is mounted on an outer-side end of the outer member, a protecting cover is mounted on an inner-side of the outer member, the seal and protecting cover close and seal annular openings formed between the outer member and the inner member;

the protecting cover is formed of non-magnetic steel sheet to have a cup-shaped configuration by press working, the protective cover includes a cylindrical fitting portion press-fit into an end inner circumference of the outer member, a donut-shaped shielding portion extends radially inward from the fitting portion via a radially reducing portion, an inner-side surface of the shielding portion is arranged near to or in contact with a rotational speed detecting sensor, a bottom portion is continuous with the shielding portion via a stepped portion to close the inner-side end of the inner member;

a sealing member is integrally adhered to the outer circumference of the radially reducing portion by vulcanizing adhesion, the sealing member includes an annular portion and a projected portion, the annular portion is formed with a diameter slightly smaller than the outer diameter of the fitting portion of the protecting cover, the projected portion is formed with a diameter slightly larger than the outer diameter of the fitting portion of the protecting cover;

the projected portion is press-fit into the end inner circumference of the outer member via a predetermined interference; and a fitting volume of the projected portion of the sealing member is determined so that it is smaller than a volume of an annular space formed between the annular portion of the sealing member and the end inner circumference of the outer member under a condition where a press-fitting tool is in contact with the sealing member.

11. The wheel bearing apparatus incorporating a rotational speed detecting apparatus of claim 10, wherein the compression ratio of the projected portion of the sealing member is limited to 45% or less.

12. A wheel bearing apparatus incorporating a rotational speed detecting apparatus comprising:

an outer member integrally formed with double row outer raceway surfaces on its inner circumference;

an inner member including a wheel hub and at least one inner ring, the wheel hub is integrally formed at one end with a wheel mounting flange, a cylindrical portion axially extends from the wheel mounting flange, the inner ring is press fit onto the cylindrical portion of the wheel hub, the wheel hub and the inner ring are formed with double row inner raceway surfaces on their outer circumferences, the inner raceway surfaces oppose the double row outer raceway surfaces;

double row rolling elements are rollably contained between the inner raceway surfaces and outer raceway surfaces of the inner member and outer member;

a magnetic encoder is adapted to be fit onto the outer circumference of the inner ring and secured to the inner ring, the magnetic encoder has a magnetic characteristics alternately and equidistantly varying in a circumferential direction;

a seal is mounted on an outer-side end of the outer member, a protecting cover is mounted on an inner-side of the outer member, the seal and protecting cover close and seal annular openings formed between the outer member and the inner member;

the protecting cover is formed of non-magnetic steel sheet to have a cup-shaped configuration by press working, the protective cover includes a cylindrical fitting portion press-fit into an end inner circumference of the outer member, a donut-shaped shielding portion extends radially inward from the fitting portion via a radially reducing portion, an inner-side surface of the shielding portion is arranged near to or in contact with a rotational speed detecting sensor, a bottom portion is continuous with the shielding portion via a stepped portion to close the inner-side end of the inner member;

a sealing member is integrally adhered to the outer circumference of the radially reducing portion by vulcanizing adhesion, the sealing member includes an annular portion and a projected portion, the annular portion is formed with a diameter slightly smaller than the outer diameter of the fitting portion of the protecting cover, the projected portion is formed with a diameter slightly larger than the outer diameter of the fitting portion of the protecting cover;

the projected portion is press-fit into the end inner circumference of the outer member via a predetermined interference; and a transitional portion between the end inner circumference and a chamfered portion of the outer member is formed as a circular arc with a predetermined radius of curvature.

13. The wheel bearing apparatus incorporating a rotational speed detecting apparatus of claim 12, wherein the end inner circumference of the outer member as well as the chamfered portion, including at least the transitional portion, are simultaneously ground by a formed grinding stone.

14. A wheel bearing apparatus incorporating a rotational speed detecting apparatus comprising:

an outer member integrally formed with double row outer raceway surfaces on its inner circumference;

an inner member including a wheel hub and at least one inner ring, the wheel hub is integrally formed at one end with a wheel mounting flange, a cylindrical portion axially extends from the wheel mounting flange, the inner ring is press fit onto the cylindrical portion of the wheel hub, the wheel hub and the inner ring are formed with double row inner raceway surfaces on their outer circumferences, the inner raceway surfaces oppose the double row outer raceway surfaces;

double row rolling elements are rollably contained between the inner raceway surfaces and outer raceway surfaces of the inner member and outer member;

a magnetic encoder is adapted to be fit onto the outer circumference of the inner ring and secured to the inner ring, the magnetic encoder has a magnetic characteristics alternately and equidistantly varying in a circumferential direction;

a seal is mounted on an outer-side end of the outer member, a protecting cover is mounted on an inner-side of the outer member, the seal and protecting cover close and seal annular openings formed between the outer member and the inner member;

the protecting cover is formed of non-magnetic steel sheet to have a cup-shaped configuration by press working, the protective cover includes a cylindrical fitting portion press-fit into an end inner circumference of the outer member, a donut-shaped shielding portion extends radially inward from the fitting portion via a radially reducing portion, an inner-side surface of the shielding portion is arranged near to or in contact with a rotational speed detecting sensor, a bottom portion is continuous with the shielding portion via a stepped portion to close the inner-side end of the inner member;

a sealing member is integrally adhered to the outer circumference of the radially reducing portion by vulcanizing adhesion, the sealing member includes an annular portion and a projected portion, the annular portion is formed with a diameter slightly smaller than the outer diameter of the fitting portion of the protecting cover, the projected portion is formed with a diameter slightly larger than the outer diameter of the fitting portion of the protecting cover;

the projected portion is press-fit into the end inner circumference of the outer member via a predetermined interference; and a cup-shaped sensor cap is fit into the inner-side end of the outer member, the rotational speed sensor is mounted on the sensor cap, and the rotational speed sensor opposes the magnetic encoder via a predetermined axial air gap.

15. The wheel bearing apparatus incorporating a rotational speed detecting apparatus of claim 14, wherein the amplitude of chatter vibration of a fitting surface of the end inner circumference of the outer member is limited to 3 μm or less.

16. The wheel bearing apparatus incorporating a rotational speed detecting apparatus of claim 14, wherein the sensor cap includes a cylindrical fitting portion to be fit into the end of the outer member and a bottom portion extending radially inward from the fitting portion, and wherein the rotational speed sensor is horizontally mounted to the road surface in a fitting bore formed in the bottom portion.

17. The wheel bearing apparatus incorporating a rotational speed detecting apparatus of claim 16, wherein a drain is formed on the corner between the fitting portion and the bottom portion of the sensor cap at a side near the road surface.

18. The wheel bearing apparatus incorporating a rotational speed detecting apparatus of claim 16, wherein a through bore is formed on the bottom portion of the sensor cap at or near its center, a securing nut is press-fit into the through bore from the outer-side of the bottom portion, and the rotational speed sensor is secured by fastening a mounting bolt into the securing nut.

19. The wheel bearing apparatus incorporating a rotational speed detecting apparatus of claim 14, wherein the sensor cap includes a cap body and a metal core, the cap body is formed of synthetic resin by injection molding and includes a cylindrical fitting portion to be press-fit into the inner-side end inner circumference of the outer member and a bottom portion that extends radially inward from the cap body fitting portion, via a stepped portion that intimately contacts with a inner-side end face of the outer member, and the metal core is molded integrally with the cap body at an opening portion.

20. The wheel bearing apparatus incorporating a rotational speed detecting apparatus of claim 19, wherein a securing nut is embedded in the mounting portion of the sensor cap by insert molding and the rotational speed sensor is secured by fastening a mounting bolt into the securing nut.

21. The wheel bearing apparatus incorporating a rotational speed detecting apparatus of claim 20, wherein the inner-side end face of the securing nut is positioned so that it is flush with or slightly projected further than the end face of the mounting portion.

22. The wheel bearing apparatus incorporating a rotational speed detecting apparatus of claim 20, wherein the securing nut is formed of stainless steel.

23. The wheel bearing apparatus incorporating a rotational speed detecting apparatus of claim 14, wherein a fitting portion of the sensor cap is press-fit onto the end outer circumference of the outer member, and an annular groove is formed on the end outer circumference of the outer member, the end of the fitting portion of the sensor cap is caulked to the annular groove.

24. The wheel bearing apparatus incorporating a rotational speed detecting apparatus of claim 14, wherein the sensor cap is formed of stainless steel sheet.

25. The wheel bearing apparatus incorporating a rotational speed detecting apparatus of claim 14, wherein the sensor cap is formed of cation electro deposited steel sheet or preserved steel sheet.

* * * * *